(12) United States Patent
Suzuki

(10) Patent No.: US 8,843,339 B2
(45) Date of Patent: Sep. 23, 2014

(54) INFORMATION PROCESSING APPARATUS, INFORMATION PROCESSING METHOD AND COMPUTER READABLE MEDIUM

(75) Inventor: Kunihiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 944 days.

(21) Appl. No.: 12/975,844

(22) Filed: Dec. 22, 2010

(65) Prior Publication Data

US 2011/0161035 A1 Jun. 30, 2011

(30) Foreign Application Priority Data

Dec. 24, 2009 (JP) ................................. 2009-293531

(51) Int. Cl.
*G06F 19/00* (2011.01)
*G06F 17/18* (2006.01)
*G06F 17/50* (2006.01)

(52) U.S. Cl.
CPC ............ *G06F 17/18* (2013.01); *G06F 17/5018* (2013.01); *G06F 17/5009* (2013.01)
USPC .............................................. 702/95; 438/17

(58) Field of Classification Search
CPC . G06F 17/18; G06F 17/5018; G06F 17/5009; G06F 2217/10
USPC ................ 702/16, 33, 85, 94, 95, 150; 703/2; 438/17
See application file for complete search history.

(56) References Cited

U.S. PATENT DOCUMENTS

2008/0166824 A1* 7/2008 Suzuki ............................ 438/17

FOREIGN PATENT DOCUMENTS

JP 2008-124075 A 5/2008

OTHER PUBLICATIONS

Ashworth, D. G. et al., "Representation of ion implantation profiles by Pearson frequency distribution curves", J. Phys. D., vol. 23 1990, pp. 870-876.
Gibbons, J. F. et al., "Estimation of impurity profiles in ion-implanted amorphous targets using joined half-Gaussian distributions", Appl. Phys. Lett., vol. 22, No. 11, Jun. 1, 1973, pp. 568-569.
Hofker, W. K. "Implantation of Boron in Silicon", Philips Research Reports Supplements, vol. 8 1975, pp. 1-121.
Park, Changhae et al., "Efficient Modeling Parameter Extraction for Dual Pearson Approach to Simulation of Implanted Impurity Profiles in Silicon", Solid-State Electronics, vol. 33, No. 6 1990, pp. 645-650.

(Continued)

*Primary Examiner* — John H Le
(74) *Attorney, Agent, or Firm* — Kratz, Quintos & Hanson, LLP

(57) ABSTRACT

An information processing apparatus includes: a receiving device receiving a distribution data series; first adjusting device adjusting first function parameter set to reduce an error, the first function parameter set specifying the position of the extreme value, and the ratio of a value at first distance on the coordinate axis from the position of the extreme value in first direction to the extreme value; second adjusting device adjusting second function parameter set to reduce an error, the second function parameter set specifying the position of the extreme value, and the ratio of a value at second distance on the coordinate axis from the position of the extreme value in second direction to the extreme value; a calculator calculating a characteristic coefficient identifying a Pearson function from a moment of a function including the first and second functions; and a distribution data calculator for calculating distribution data by a Pearson function.

20 Claims, 27 Drawing Sheets

(56) References Cited

OTHER PUBLICATIONS

Suzuki, Kunihiro et al., "Analytical expression for ion-implanted impurity concentration profiles", Solid-State Electronics, vol. 44 2000, pp. 2253-2257.

Suzuki, Kunihiro et al., "Compact and Comprehensive Database for Ion-Implanted As Profile", IEEE Transactions on Electron Devices, vol. 47, No. 1 Jan. 2000, pp. 44-49.

Suzuki, Kunihiro et al., "Comprehensive Analytical Expression for Dose Dependent Ion-Implanted Impurity Concentration Profiles", Solid-State Electronics, vol. 42, No. 9 1998, pp. 1671-1678.

Suzuki, Kunihiro et al., "Simple Analytical Expression for Dose Dependent Ion-Implanted Sb Profiles Using a Joined Half Gaussian Function and One With Exponential Tail", Solid-State Electronics, vol. 42, No. 3 1998, pp. 463-465.

Tasch, Al F. et al., "An Improved Approach to Accurately Model Shallow B and BF2 Implants in Silicon", J. Electrochem., Soc., vol. 136, No. 3 Mar. 1989, pp. 810-814.

\* cited by examiner

FIG. 4

Table II Ion implantation distribution parameter
Boron

| Energy(keV) | $R_p$ (μm) | $\Delta R_p$ (μm) | γ | β |
|---|---|---|---|---|
| 20 | 0.05494 | 0.04163 | −1.5 | 9.2187 |
| 40 | 0.12269 | 0.05537 | −1.5 | 9.101 |
| 60 | 0.18387 | 0.06908 | −1.5 | 9.005 |
| 80 | 0.23551 | 0.07335 | −1.5 | 8.9261 |

FIG. 21

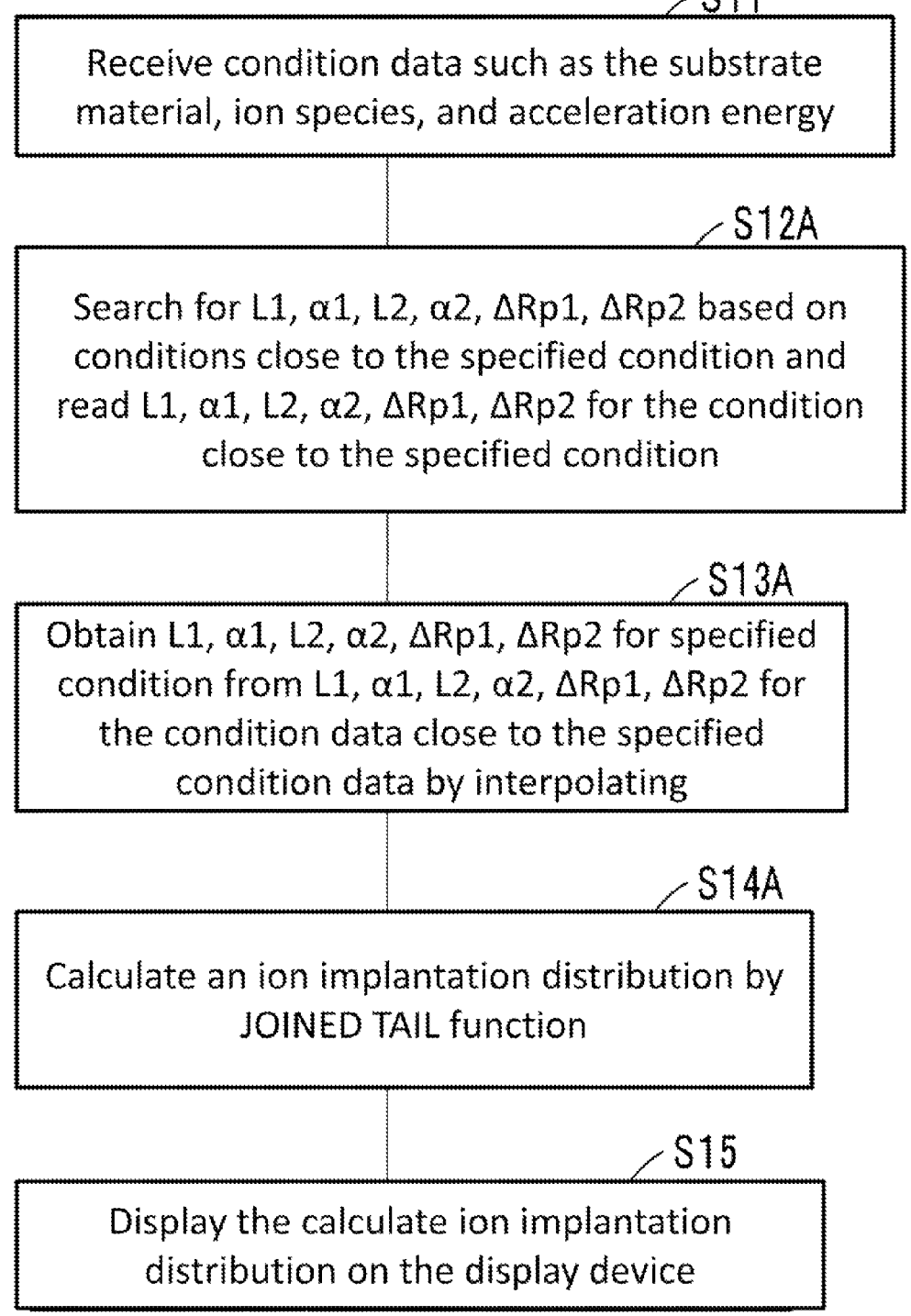

S11: Receive condition data such as the substrate material, ion species, and acceleration energy S12A: Search for L1, α1, L2, α2, ΔRp1, ΔRp2 based on conditions close to the specified condition and read L1, α1, L2, α2, ΔRp1, ΔRp2 for the condition close to the specified condition S13A: Obtain L1, α1, L2, α2, ΔRp1, ΔRp2 for specified condition from L1, α1, L2, α2, ΔRp1, ΔRp2 for the condition data close to the specified condition data by interpolating S14A: Calculate an ion implantation distribution by JOINED TAIL function S15: Display the calculate ion implantation distribution on the display device

FIG. 24

S11 Receive condition data such as the substrate material, ion species, and acceleration energy

S12B Search for Rp1, ΔRp1, γ1, B1, Rp2, ΔRp2, γ2, B2 based on conditions close to the specified condition and read Rp1, ΔRp1, γ1, B1, Rp2, ΔRp2, γ2, B2 for the condition close to the specified condition

S13B Obtain Rp1, ΔRp1, γ1, B1, Rp2, ΔRp2, γ2, B2 for specified condition from Rp1, ΔRp1, γ1, B1, Rp2, ΔRp2, γ2, B2 for the condition data close to the specified condition data by interpolating

S14B Calculate an ion implantation distribution for specified conditions

S15 Display the calculate ion implantation distribution on the display device

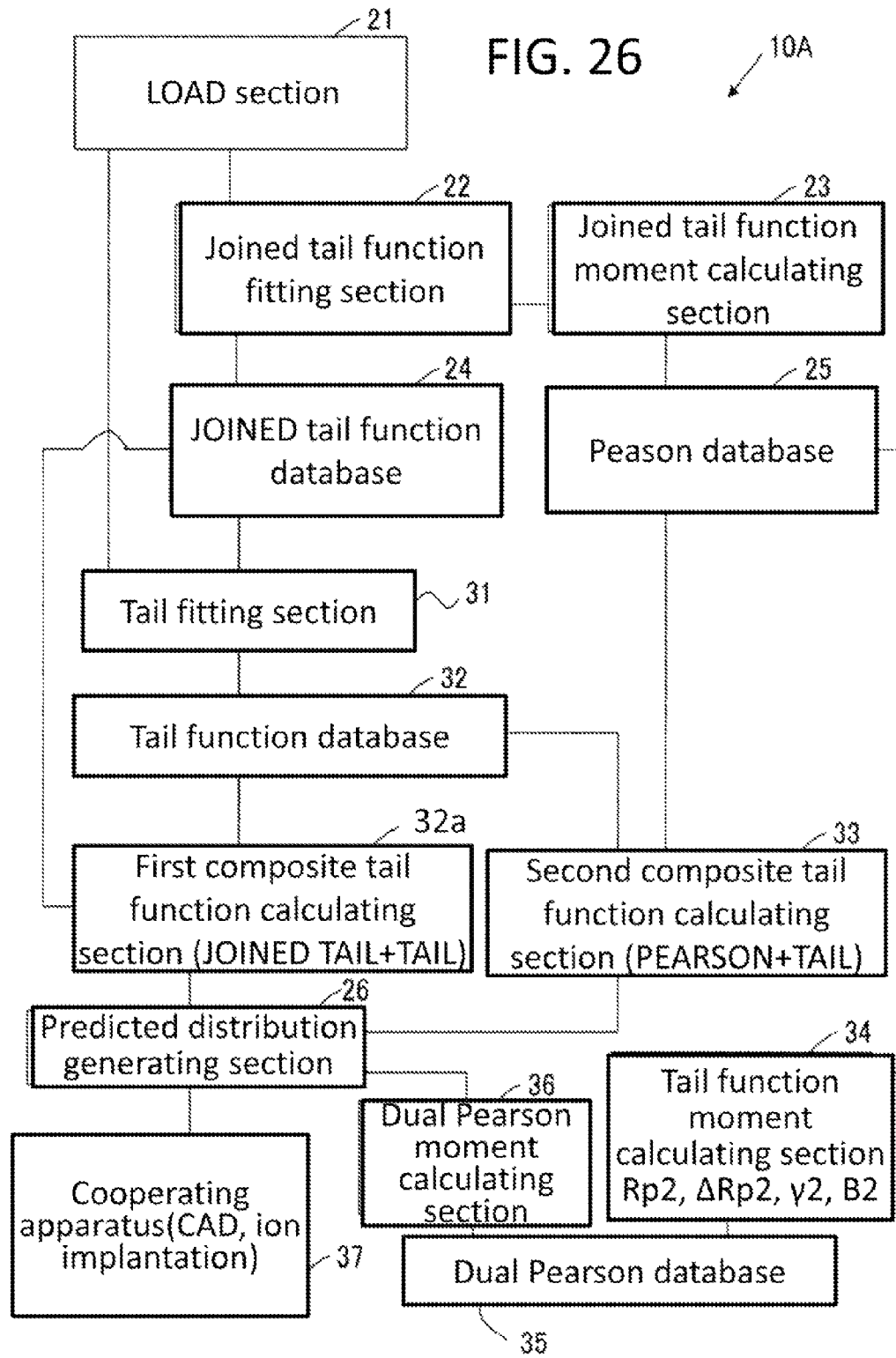

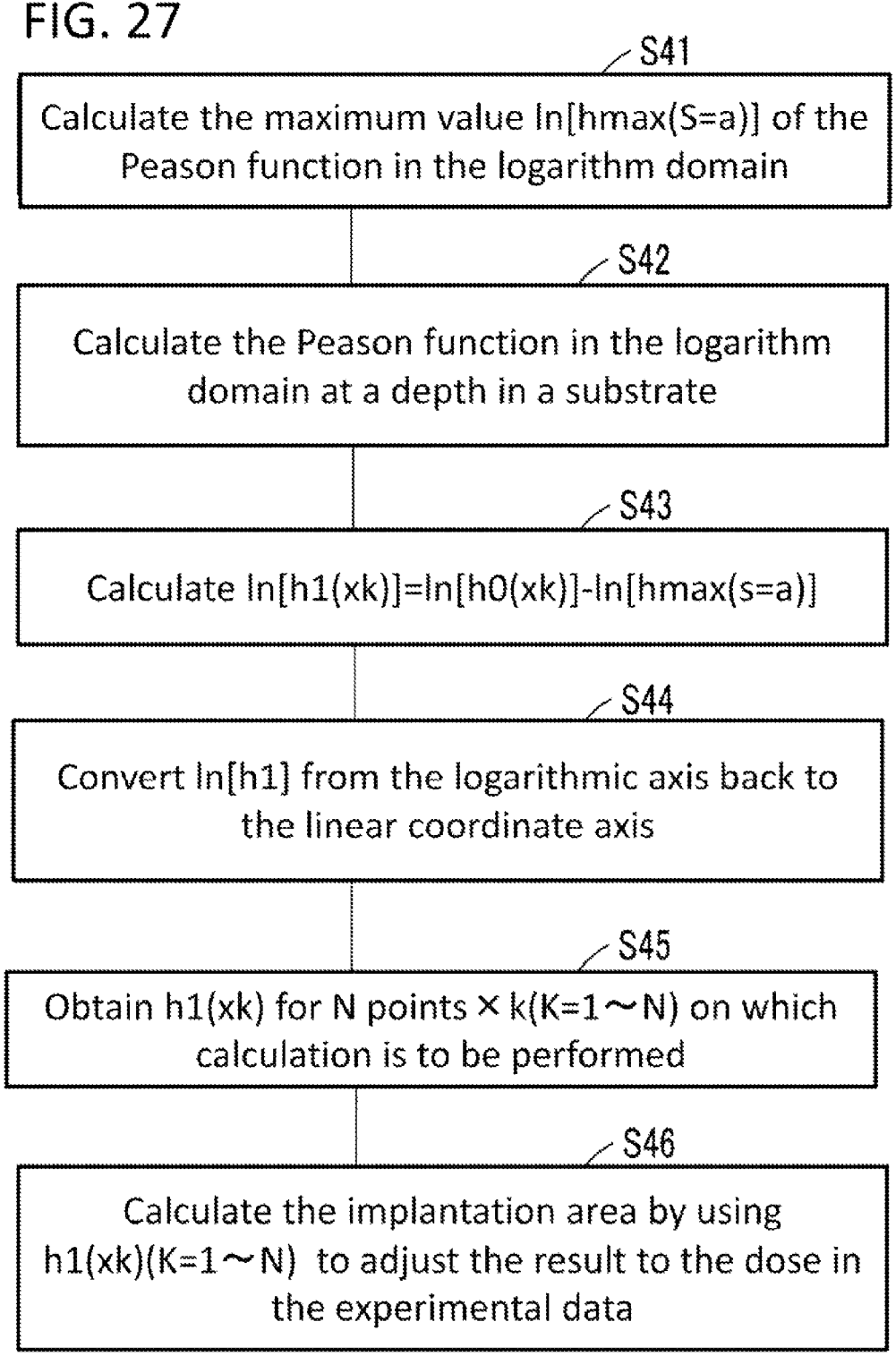

INFORMATION PROCESSING APPARATUS, INFORMATION PROCESSING METHOD AND COMPUTER READABLE MEDIUM

CROSS-REFERENCE TO RELATED APPLICATION

This application is based upon and claims the benefit of priority from the prior Japanese Patent Application NO. 2009-293531 filed on Dec. 24, 2009, the entire contents of which are incorporated herein by reference.

FIELD

The embodiments discussed herein are related to an information processing apparatus, an information processing method and computer readable medium.

BACKGROUND

Distribution data of phenomena has been used in various industrial fields. Examples of distributions of phenomena include distributions of physical characteristics and chemical characteristics of materials in the material industry, distributions of customer preferences in product categories, distributions of product prices, and distributions of predictive probability of a certain result in research on needs trends.

For example, data on the distribution of ions implanted into a semiconductor substrate in the substrate depth direction in a semiconductor manufacturing process (hereinafter referred to as ion implantation distribution) may be obtained by experiment or simulation. In general, ion implantation distributions are acquired as a result of implantation under certain conditions. To predict an ion implantation distribution for given conditions different from conditions under which an ion implantation distribution has been obtained, the following procedure is followed.

(1) A mathematical expression that enables analysis of ion implantation distribution data is provided. The mathematical expression represents a model function that agrees with ion implantation distribution data within some margin of error. Here, the model function may also be called approximation function. The model function is a function on coordinate axes where the horizontal axis represents positions in the semiconductor substrate in the depth direction and the vertical axis represents the concentrations of implanted ions. The model function has multiple parameters. Data on ion implantation distribution in at least a certain depth range under different conditions may be estimated by changing the values of the parameters of the model function.

(2) A computer that manages ion implantation distributions stores in a database the relationships between multiple implantation conditions and parameters of the approximation functions that approximate ion implantation distributions under multiple conditions for ion implantation distribution data acquired under the multiple conditions.

(3) The computer determines interpolated values of the parameters for conditions different from the conditions stored in the database on the basis of the relationships between the conditions and the parameters in the database and predicts ion implantation distributions from the approximation function.

Pearson distributions or the dual Pearson distributions have been used as functions for modeling ion implantation distributions. For example, the concentration $N(x)$ of ions of a given material implanted to a depth x in a substrate of a given semiconductor at a given acceleration energy may be expressed by the following dual Pearson distribution:

$$N(x) = (\Phi - \Phi chan) * ha(x) + \Phi chan * hc(x) \quad \text{[Expression 1]}$$

where $\Phi$ is the total dose of the implanted ions, $\Phi chan$ is the dose of channeling ions. Ion implantation distribution curves often have a peak. A concentration distribution called "tail" which approaches asymptotically to a concentration of 0 is often formed in the semiconductor substrate in the depth direction from the peak. The tail is thought to be caused by implanted ions that snake through gaps between crystal axes in the semiconductor substrate. The tail is therefore also called channeling part and the dose in the tail is also called channeling dose.

Of the total dose $\Phi$, $\Phi - \Phi chan$ is called the dose component in the amorphous part. The amorphous part corresponds to the ion implantation distribution of ions implanted in an amorphous semiconductor substrate. It is thought that in a highly dosed, high-ion-concentration region, crystals in the semiconductor substrate may be destroyed and implanted ions exhibit a distribution similar to that of ions implanted in an amorphous semiconductor substrate. Therefore, the peak region of an ion implantation distribution is called amorphous part.

In Equation 1, $ha(x)$ is a function representing the Pearson distribution corresponding to the amorphous part and $hc(x)$ is a function representing the Pearson distribution corresponding to the channeling part. Equation 1 uses both the Pearson distribution corresponding to the amorphous part and the Pearson distribution corresponding to the channeling part to represent an ion implantation distribution and hence called dual Pearson distribution.

The Pearson distribution is expressed by the function given below. Here, a Pearson IV function among the functions called Pearson function family will be illustrated with an independent variable denoted by x. The Pearson IV function is also called Pearson IV distribution. The Pearson IV function will be hereinafter sometimes simply referred to as Pearson function. The Pearson IV distribution will be sometimes simply referred to as Pearson distribution.

The Pearson function takes various forms depending on the value of $(\gamma^2, \beta)$. Pearson IV is one of the various forms. While an equation of only Pearson IV will be given here, the same discussion applies to other Pearson functions as well. A Pearson distribution for $(\gamma^2, \beta)$ is used herein.

[Expression 2]
$$Hma(x) = K|b_0 + b_1 x + b_2 x^2|^{\frac{1}{2b_2}} \exp\left[-\left(\frac{b_1}{2b_2} + a\right)\frac{2}{\sqrt{4b_2 b_0 - b_1^2}} \tan^{-1}\left(\frac{2b_2 x + b_1}{\sqrt{4b_2 b_0 - b_1^2}}\right)\right]$$

Here,
Rp is the parameter representing the projected range of ions in a distribution representing ion implantation in the Pearson IV distribution or a Gaussian distribution. $\Delta Rp$ is the parameter representing the standard deviation around Rp in the Pearson IV distribution function or Gaussian distribution function, that is, the spread of the distribution;
$\gamma$ is the parameter representing the left-right asymmetry of the ion implantation distribution in Pearson IV;
$\beta$ is the parameter representing the sharpness of the peak of the ion implantation distribution in Pearson IV;

Hma(x) is the distribution function of the amorphous part of the ion implantation distribution. The amorphous part is also called main part.

x is the depth from the surface of the substrate;
K is a normalization constant;
A is $10\beta-12\gamma^2-18$;
a0 is equal to $-\Delta Rp\gamma(\beta+3)/A$:
b0 is equal to $-\Delta Rp^2(4\beta-3\gamma^2)/A$;
b1 is equal to a0;
b2 is equal to $-(2\beta-3\gamma^2-6)$; and
D is equal to $4b_2bo-b_1^2$. Among these parameters, parameters Rp, $\Delta Rp$, $\gamma$ and $\beta$ are called moment parameters. When the values of the moment parameters (Rp, $\Delta Rp$, $\gamma$ and $\beta$) are determined, the value of the Pearson IV distribution function is determined.

FIG. 1 illustrates an exemplary ion implantation distribution in an amorphous silicon substrate. Characteristics of the Pearson distribution itself will be discussed below through discussion of distributions in amorphous crystals, with influences of the channeling part being reduced. In FIG. 1, the horizontal axis represents the depth in the substrate and the vertical axis represents ion concentration measured using a Secondary Ion-microprobe Mass Spectrometry (SIMS). FIG. 1 illustrates results of ion implantations at varying ion (boron) acceleration energies ranging from 20 keV to 80 keV.

As illustrated in FIG. 1, the peak moves in the substrate depth direction as the acceleration energy increases. The rising section of the distribution profile increases with respect to the substrate depth x as the acceleration energy increases. The profile of the rising section of the 80-keV distribution is almost exponential. On the other hand, the ion concentration rapidly decreases in the section deeper than the peak. Accordingly, the distribution profile becomes more asymmetrical about the peak with increasing acceleration energy. The Pearson distribution may also accurately represent a distribution that is asymmetrical and skewed from a Gaussian distribution, like the 80-keV distribution in FIG. 1.

FIG. 2 illustrates dependence of Rp and $\Delta R_p$ on acceleration energy. FIG. 3 illustrates dependence of $\gamma$ and $\beta$ on acceleration energy. FIGS. 2 and 3 illustrate relationships between acceleration energies and the moment parameters (Rp, $\Delta R_p$, $\gamma$ and $\beta$), where the sets of moment parameters (Rp, $\gamma R_p$, $\gamma$ and $\beta$) Pearson are determined so that the moment parameters match ion implantation distributions obtained by varying acceleration energy.

As illustrated in FIG. 2, Rp and $\Delta R_p$ depend on the energy almost linearly. However, the dependence of $\Delta R_p$ on the energy is small as compared with Rp. In FIG. 3, $\gamma$ is generally $-1.5$, which agrees with the fact that the peak of the ion implantation distribution in FIG. 1 is skewed to the deeper side from the center of the distribution range of implanted ions (in the direction opposite to the surface of the substrate). Here, $\beta$ is approximately 9. FIG. 4 lists exemplary parameter values.

As illustrated in FIG. 1, the Pearson distribution seemingly may represent almost every ion implantation distribution without problems. However, the peaks of the ion implantation distributions in FIG. 1 are skewed to the deeper side from the center of the distribution range of implanted ions. This qualitatively corresponds to the fact that $\gamma$ is negative. A closer look shows that the ion implantation distribution at an acceleration energy of 20 keV is relatively symmetric, but the skew of the peak of the ion implantation distribution increases as acceleration energy increases. That is, FIG. 1 qualitatively represents that the asymmetry of a distribution increases with increasing acceleration energy. It may be presumed that this may be represented by a negative value of the moment parameter $\gamma$ which represents asymmetry and by the absolute value of $\gamma$ that increases with increasing acceleration energy.

However, FIGS. 3 and 4 do not represent such trend. Specifically, the value of $\gamma$ is generally constant at $-1.5$. The reason why the value of $\gamma$ does not necessarily vary as a function of acceleration energy will be described below.

FIG. 5 illustrates an example in which a Pearson distribution is fitted to a 60-keV Boron (B) distribution. It may be seen from FIG. 5 that distributions for different sets of ($\gamma$, $\beta$) may be represented with nearly equal accuracy. That is, there may exist different sets of ($\gamma$, $\beta$) for one Pearson distribution. In other words, the combinations of ($\gamma$, $\beta$) for one Pearson distribution lack uniqueness.

The lack of uniqueness will be a hindrance to building of a database. In order to reflect the trend of the distribution profile as has been described above, $\gamma$ needs to be decreased in the negative direction (the absolute value of $\gamma$ needs to be increased) as energy increases. However, there is substantial arbitrariness in determination of the value of $\gamma$. For example, the moment parameter may be extracted with a minimal change of $\beta$. For $\gamma$ in a certain range of values, the Pearson distribution accurately represents one distribution by adjusting the value of $\beta$ according to the value of $\gamma$. That is, parameters $\gamma$ and $\beta$ interact with each other to a great degree. As energy increases, parameter $\gamma$ monotonically decreases in the negative direction (the absolute value of $\gamma$ increases). However, it is difficult to quantitatively determine $\gamma$ while ensuring the uniqueness of $\gamma$ in the process of matching the Pearson distribution to ion implantation distribution data.

FIG. 6 illustrates an allowable region ($\beta > \beta_3$) for the Pearson function family. Roman numerals I to VI in FIG. 6 denote functions included in the Pearson function family. Curves $\beta_3$, $\beta_{b2}$, and $\beta_{D2}$ correspond to conditional expressions that characterize the regions where the functions in the Pearson function family exist. For example, the Pearson IV function is in the range $\beta_{D2} < \beta$.

Combinations ($\gamma$, $\beta$) in FIG. 3 which are effective for 60-keV boron 3 is represented by the dashed line in FIG. 6. It may be seen from FIG. 6 that a considerably wide range of combinations of values indicated by the dashed line in FIG. 6 are possible under the single condition of 60 keV.

[Patent Document] Japanese Laid-Open Patent Publication No. 2008-124075

[Non-patent Document]

A. F. Tasch, H. Shin, C. Park, J. Alvis and S. Novak, "An improved approach to accurately model shallow B and BF2 implants in silicon", J. Electrochem. Soc. (U.S.A.), 1989, Vol. 136, pp. 810-814

C. Park, K. M. Klein and A. F. Tasch, "Efficient modeling parameter extraction for dual Pearson approach to simulation of implanted impurity profiles in silicon", Solid-State Electronics, (U.S.A.), 1990, Vol. 33, pp. 645-650

K. Suzuki, Ritsuo Sudo and T. Feudel, "Simple analytical expression for dose dependent ion-implanted Sb profiles using a joined half Gaussian function and one with exponential tail", Solid-State Electronics, (U.S.A), 1998, Vol. 42, pp. 463-465

K. Suzuki, R. Sudo, Y. Tada, M. Tomotani, T. Feudel, and W. Fichtner, "Comprehensive analytical expression for dose dependent ion-implanted impurity concentration profiles", Solid-State Electronics, (U.S.A.), 1998, Vol. 42, pp. 1671-1678

K. Suzuki, R. Sudo, T. Feudel, and W. Fichtner, "Compact and comprehensive database for ion-implanted As profile, "IEEE Trans. Electron Devices, (U.S.A.), 2000, ED-47, No. 1, pp. 44-49

K. Suzuki and R. Sudo, "Analytical expression for ion-implanted impurity concentration profiles", Solid-State Electronics, Vol. 44, pp. 2253-2257, 2001

W. K. Hofker, "Implantation of boron in silicon", Philips Res. Rep. Suppl., (Netherlands), 1975, Vol. 8, pp. 1-121

D. G. Ashworth, R. Oven, and B. Mundin, "Representation of ion implantation profiles by Pearson frequency distribution curves", J. Phys. D., (U.S.A.), 1990, Vol. 23, pp. 870-876

J. F. Gibbons, S. Mylroie, "Estimation of impurity profiles in ion-implanted amorphous targets using joined half-Gaussian distributions", Appl. Phys. Lett., (U.S.A.), 1973, Vol. 22, p. 568-569

As has been described above, it is difficult to obtain a single unique set of $(\gamma, \beta)$ when a Pearson distribution is fitted to phenomenon distribution data. For example, when fitting a Pearson function to distribution data of one phenomenon, arbitrariness of set $(\gamma, \beta)$ makes it difficult to store the relationships between conditions under which phenomenon distribution data have been acquired and $(\gamma, \beta)$ of the Pearson distribution that matches the distribution data of the phenomenon. It is also difficult to interpolate the values of parameters under conditions other than conditions under which distribution data of a phenomenon has been acquired, on the basis of the relationships between the conditions and the parameters, to predict distribution data for the phenomenon from a Pearson function using interpolated values.

SUMMARY

According to one aspect of the embodiments, there is an information processing apparatus. The information processing apparatus receives a distribution data series including an extreme value among the values corresponding to positions on a coordinate axis and data describing the conditions under which the distribution data series has been obtained.

The information processing apparatus adjusts a first function parameter set included in a first function to reduce an error between data generated by a first function and the distribution data series. The first function parameter set specifies the position of the extreme value, the ratio of the value at a first distance from the position of the extreme value on a coordinate axis in a first direction to the extreme value, and an order of an expression of an exponent part of a function curve including an exponential form in the interval from the position of the extreme value to the first distance in the first direction.

The information processing apparatus also adjusts a second function parameter set included in a second function to reduce an error between data generated by a second function and the distribution data series. The second function parameter set specifies the position of the extreme value, the ratio of the value at a second distance from the position of the extreme value on a coordinate axis in a second direction to the extreme value, and an order of an expression of an exponent part of a function curve including an exponential form in the interval from the position of the extreme value to the second distance in the second direction.

The information processing apparatus calculates a characteristic coefficient that identifies a Pearson function from the moments of a function consisting of the first function and the second function joined at the position of the extreme value. The information processing apparatus stores the characteristic coefficient in a database in association with the data describing the conditions under which the distribution data series has been obtained. The information processing apparatus interpolates a characteristic coefficient for condition data of interest from the characteristic coefficient stored in the database. The information processing apparatus calculates distribution data by a Pearson function identified by the interpolated characteristic coefficient.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 4 is a table listing parameter values;

FIG. 21 is a flowchart of a process for interpolating parameters of a joined tail function to obtain an ion concentration distribution for specified condition data;

FIG. 24 is a flowchart of a process for obtaining a concentration distribution of an ion implantation distribution from moment parameters of a dual Pearson distribution by interpolation;

FIG. 26 is a diagram illustrating an exemplary configuration of a system including a cooperative device which cooperates with an information processing apparatus; and FIG. 27 is a flowchart of a process performed by an information processing apparatus of a sixth embodiment.

DESCRIPTION OF EMBODIMENTS

Figure 1:
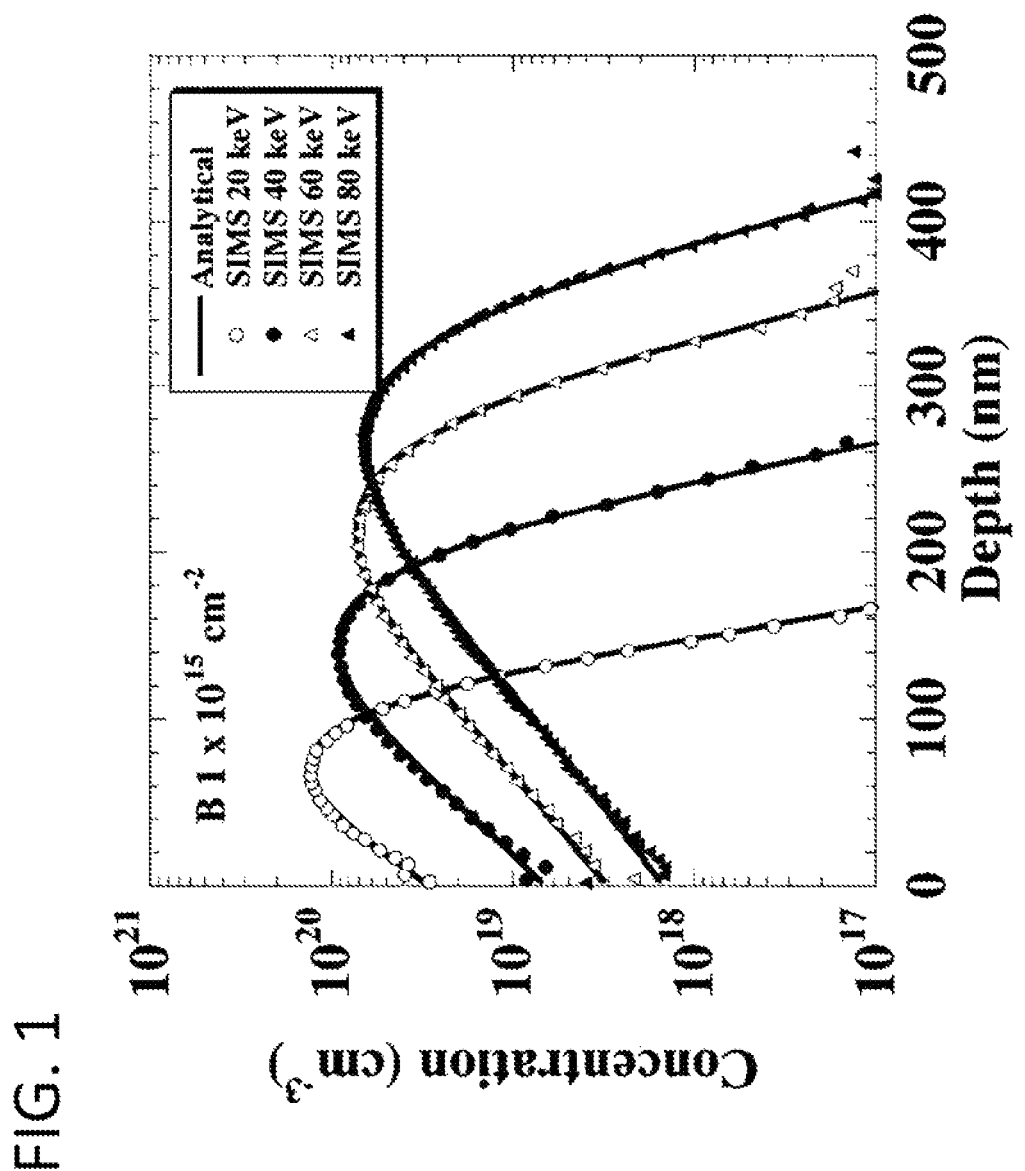
FIG. 1 is a diagram illustrating an exemplary ion implantation distribution in an amorphous silicon substrate.
Figure 2:
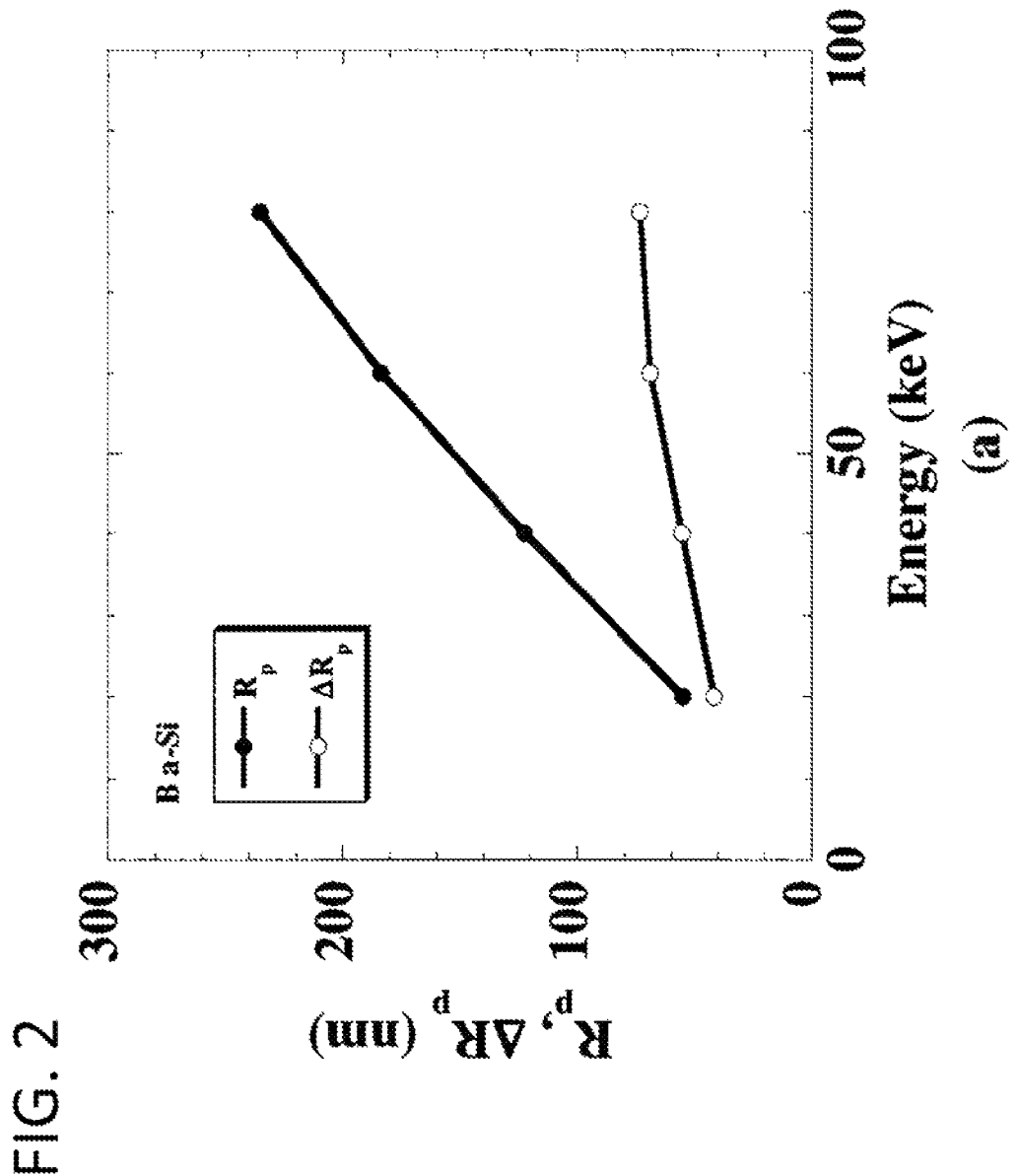
FIG. 2 is a diagram illustrating dependence of Rp and ΔRp on acceleration energy.
Figure 3:
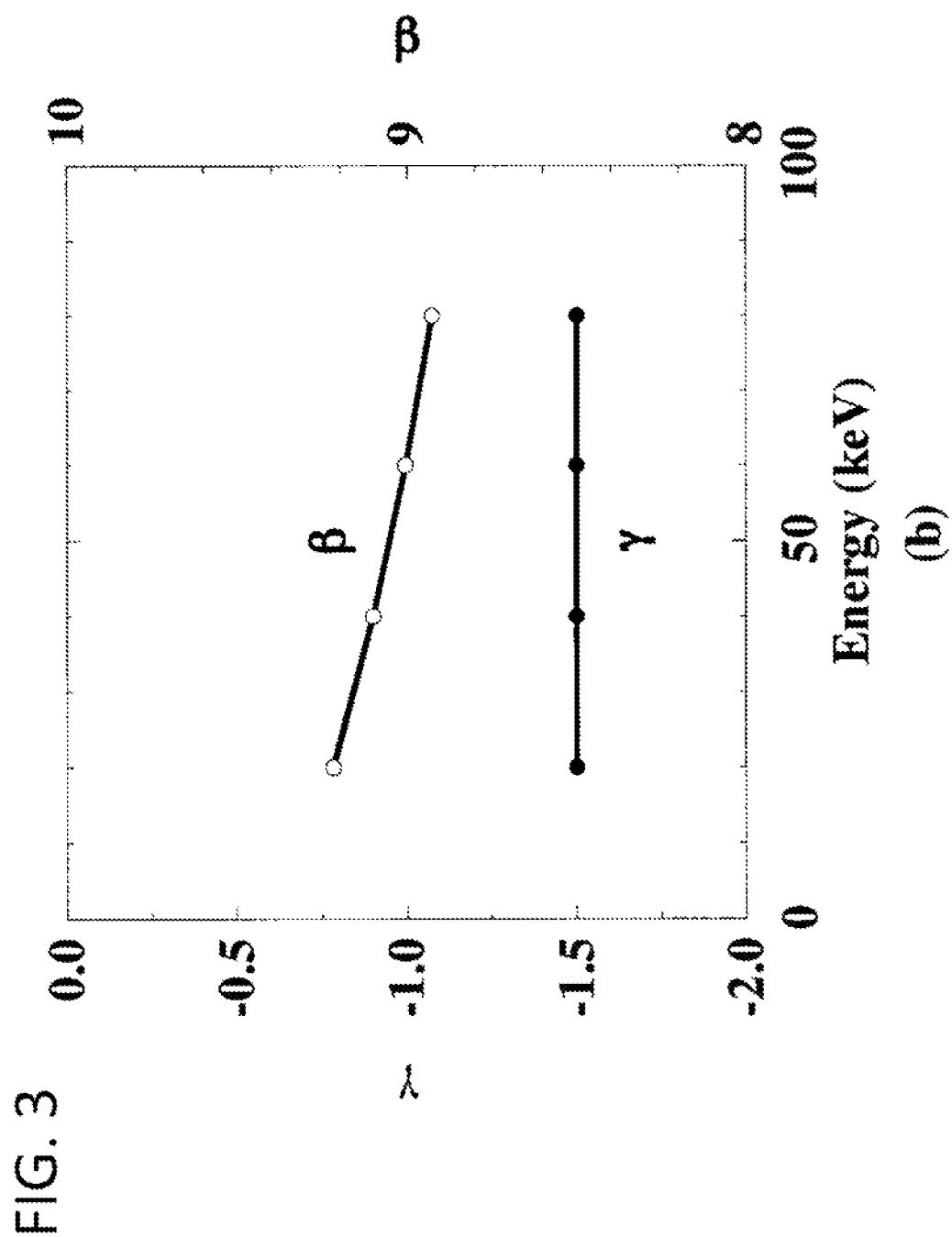
FIG. 3 is a diagram illustrating dependence of $\gamma$ and $\beta$ on acceleration energy.
Figure 5:
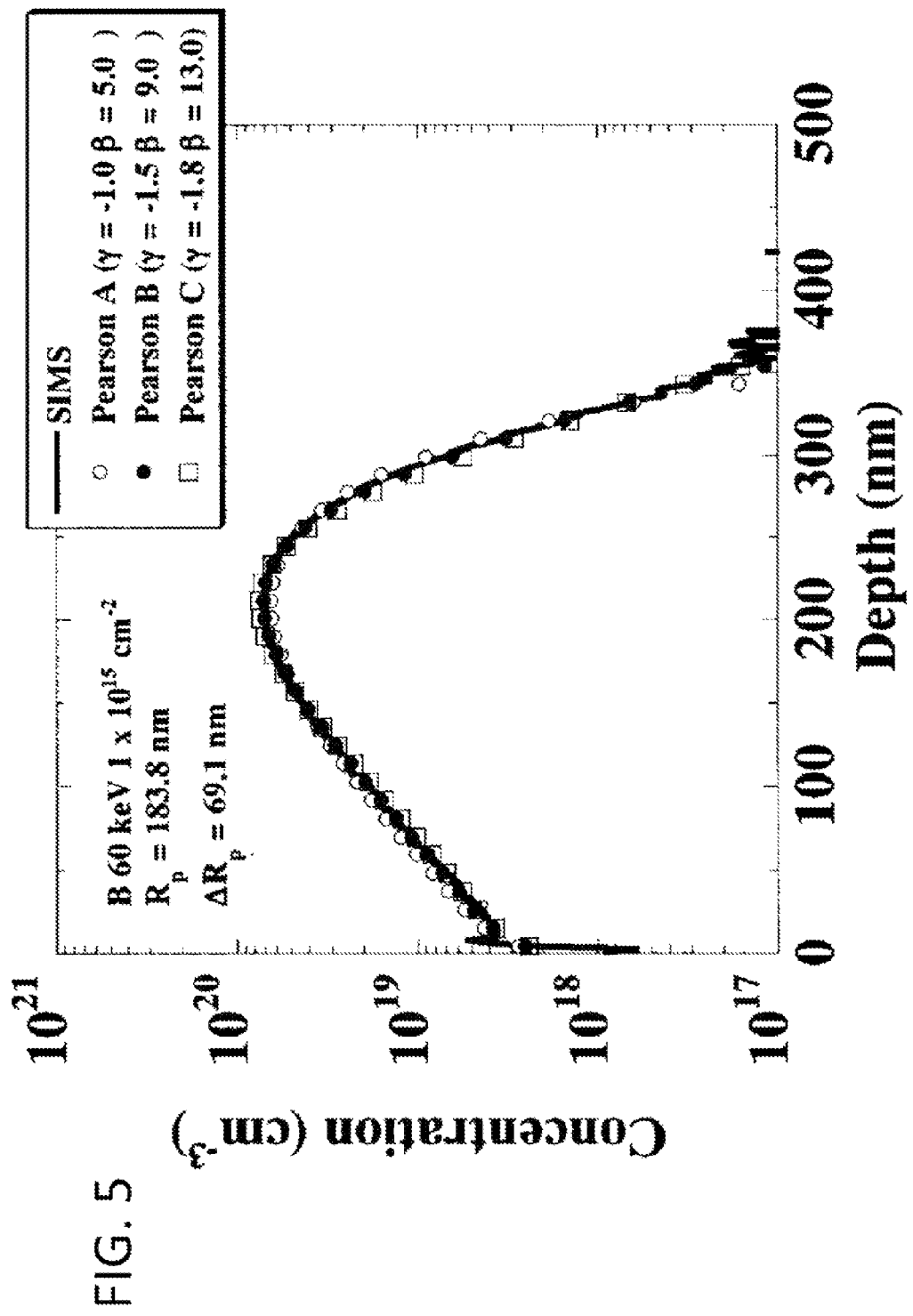
FIG. 5 is a diagram illustrating an example in which a Pearson distribution is fitted to a 60-keV boron (B) distribution.

An information processing apparatus according to one embodiment will be described with reference to drawings. Configurations of the embodiment described below are illustrative only and the information processing apparatus is not limited to the configurations of the embodiment.

The information processing apparatus of the present embodiment uses a function called joined tail function to analytically represent distribution data of a phenomenon such as ion implantation distribution. Specifically, the information processing apparatus of the present embodiment reads ion implantation distribution data and fits parameters to the ion implantation distribution data so that the shape of the joined tail function matches the ion implantation distribution data. A process using a joined half Gaussian function will be described first as a comparative example and then a process using the joined tail function will be described.

<Gaussian Function and Joined Half Gaussian Function>

A Gaussian distribution may be expressed by Equation 3 by using $R_p$ and $\Delta R_p$.

$$N(x) = N_m \exp\left[-\frac{1}{2}\left(\frac{x - R_p}{\Delta R_p}\right)^2\right] \quad \text{[Expression 3]}$$

Here, Rp is a position of the peak concentration $N_m$. In the Gaussian distribution, $(\gamma, \beta) = (0, 3)$. That is, if the distribution is represented by a Gaussian function, $(\gamma, \beta)$ is uniquely determined. However, the Gaussian distribution may not represent asymmetry and therefore the accuracy of the representation of the distribution is limited.

The joined half Gaussian function in Equation 4 has been proposed as a function that represents asymmetry.

$$N(x) = \begin{cases} N_m \exp\left[-\frac{1}{2}\left(\frac{x - R_{pm}}{\Delta R_{p1}}\right)^2\right] & x \leq R_{pm} \\ N_m \exp\left[-\frac{1}{2}\left(\frac{x - R_{pm}}{\Delta R_{p2}}\right)^2\right] & x > R_{pm} \end{cases} \quad \text{[Expression 4]}$$

Here, $R_{pm}$ is a position of the peak concentration $N_m$ as in Equation 3 and $\Delta R_{p1}$ and $\Delta R_{p2}$ are the standard deviations of the respective regions ($x \leq R_{pm}$ and $R_{pm} < x$), that is, the spreads of the distributions.

In the joined half Gaussian function, the ratio r of the spread of the distribution is defined by Equation 5:

$$\Delta R_{p2}/\Delta R_{p1} = r; \quad \text{[Expression 5]}$$

Then, $\gamma$ and $\beta$ may be uniquely determined by calculating moments as:

$$\gamma = \frac{\sqrt{\frac{2}{\pi}}(r-1)\left[\left(\frac{4}{\pi} - 1\right)(r-1)^2 + r\right]}{\left[\left(1 - \frac{2}{\pi}\right)(r-1)^2 + r\right]^{\frac{3}{2}}} \quad \text{[Expression 6]}$$

$$\beta = \frac{\left[3 - \frac{4}{\pi} - 3\left(\frac{2}{\pi}\right)^2\right](r-1)^4 + \left(9 - \frac{20}{\pi}\right)(r-1)^2 + 3r^2}{\left[\left(1 - \frac{2}{\pi}\right)(r-1)^2 + r\right]^2} \quad \text{[Expression 7]}$$

The values of $\gamma$ and $\beta$ have the following restrictions.

$$\lim_{r \to 0} \gamma = -\frac{\sqrt{\frac{2}{\pi}}\left(\frac{4}{\pi} - 1\right)}{\left(1 - \frac{2}{\pi}\right)^{\frac{3}{2}}} = -0.995272 \quad \text{[Expression 8]}$$

$$\lim_{r \to \infty} \gamma = \frac{\sqrt{\frac{2}{\pi}}\left(\frac{4}{\pi} - 1\right)}{\left(1 - \frac{2}{\pi}\right)^{\frac{3}{2}}} = 0.995272 \quad \text{[Expression 9]}$$

$$\lim_{r \to 0, \infty} \beta = \frac{\left[3 - \frac{4}{\pi} - 3\left(\frac{2}{\pi}\right)^2\right]}{\left(1 - \frac{2}{\pi}\right)^2} = 3.86918 \quad \text{[Expression 10]}$$

$$|\gamma| \leq \frac{\sqrt{\frac{2}{\pi}}\left(\frac{4}{\pi} - 1\right)}{\left(1 - \frac{2}{\pi}\right)^{\frac{3}{2}}} = 0.995272, \quad \text{[Expression 11]}$$

$$\beta \leq \frac{\left[3 - \frac{4}{\pi} - 3\left(\frac{2}{\pi}\right)^2\right]}{\left(1 - \frac{2}{\pi}\right)^2} = 3.86918$$

As in Equations 6 and 7, $\gamma$ and $\beta$ may be related with each other through r. That is, if r and one of $\gamma$ and $\beta$ are determined, the other is determined. The curve labeled "joined half Gauss" in FIG. 6 represents the range of values that the joined half Gauss function may take on under the restrictions by Equations 6 to 11.

Figure 6:
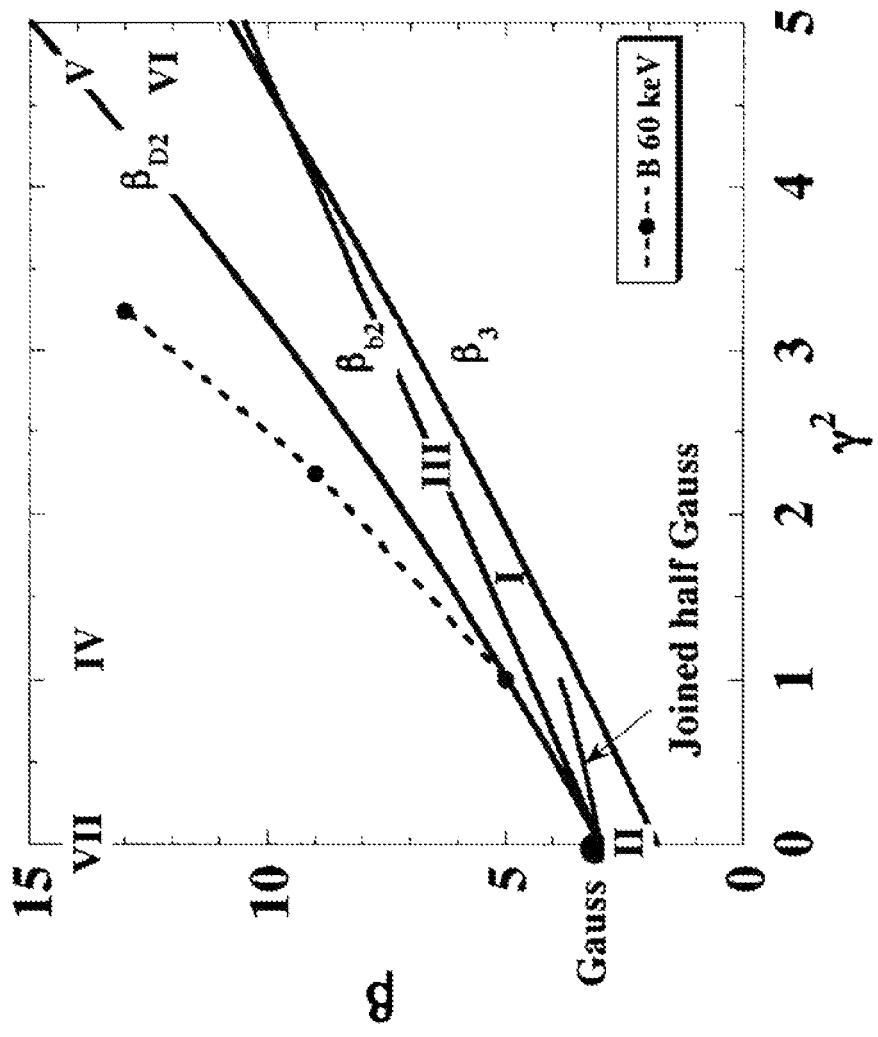
FIG. 6 is a diagram illustrating an allowable region of the Pearson function family.

As illustrated in FIG. 6, the joined half Gaussian function exists in a very limited range of $(\gamma, \beta)$. Parameters that represent the spreads of the distributions are $\Delta R_{p1}$ and $\Delta R_{p2}$, which are practically independent of each other. Therefore, it may be expected that a limited range of $(\gamma, \beta)$ may be obtained by fitting the parameters of the joined half Gaussian function so that the joined half Gaussian function matches the ion implantation distribution and then calculating the moments of the joined half Gaussian function. It is also may be expected that if $\Delta R_{p1}$ and $\Delta R_{p2}$ continuously change with energy, r and therefore $\gamma$ and $\beta$, which uniquely depend on $\Delta R_{p2}/\Delta R_{p1}$, will also continuously change.

Figure 7:
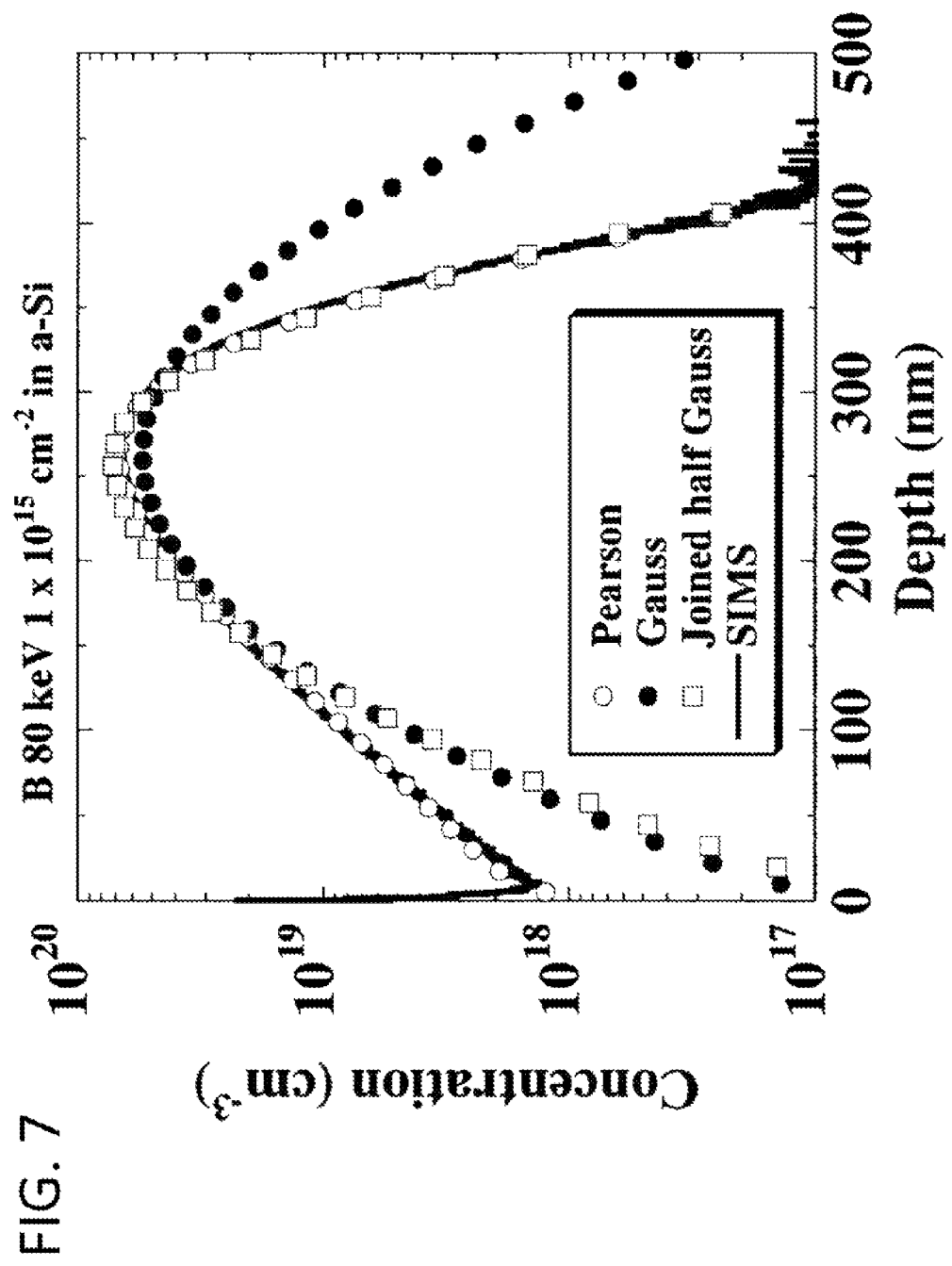
FIG. 7 is a diagram illustrating comparison among a Gaussian function, a joined half Gaussian function and a Pearson distribution fitted to the an implanted 60-keV boron (B) distribution.

However, a problem with the joined half Gaussian function is that the joined half Gaussian function may not represent all distributions. FIG. 7 compares a Gaussian function, joined half Gaussian function and Pearson distribution fitted to a boron (B) ion implantation distribution. The Gaussian function does not represent the asymmetrical distribution. The joined half Gaussian function successfully represents the asymmetry and provides a good representation of the distribution on the side deeper than the peak and the distribution on the surface side near the peak. However, the joined half Gaussian function does not represent the distribution in the low concentration region on the surface side where the distribution more mildly changes than the Gaussian function. The Pearson distribution successfully represents this distribution.

<Joined Tail Function>

Therefore, a simple function in which interaction between parameters is low and ($\gamma$, $\beta$) exist in a limited range is used to represent ion implantation distribution as accurately as the Pearson distribution. Here, "interaction between parameters is low" means that the correlation between the parameters that define the function is weak. A method will be considered in which the simple function is used and the parameters of the simple function are continuously changed while estimating ($\gamma$, $\beta$) and the obtained ($\gamma$, $\beta$) are used to generate a Pearson distribution.

Equation 12 illustrates a simple function in which the ranges where ($\gamma$, $\beta$) exist are limited. Equation 12 will be referred to as a joined tail function. The joined tail function represents a first composite function. The function of one of the regions (where $x \leq R_{pm}$ and $R_{pm} < x$) of the Equation 12 represents the first function and the other represents the second function.

$$N(x) = \begin{cases} N_m \exp\left[-\frac{1}{2}\left(\frac{R_{pm}-x}{\Delta R_{p1}}\right)^{\alpha_1}\right] & x \leq R_{pm} \\ N_m \exp\left[-\frac{1}{2}\left(\frac{x-R_{pm}}{\Delta R_{p2}}\right)^{\alpha_2}\right] & x > R_{pm} \end{cases} \quad \text{[Expression 12]}$$

As in the joined half Gaussian function, $R_p$ is the position where the peak concentration $N_m$ is reached and $\Delta R_{p1}$ and $\Delta R_{p2}$ are the standard deviations in the regions where $x \leq R_{pm}$ and $R_{pm} < x$, respectively, that is, the spreads of the distributions. The joined tail function may be said to be a joined half Gaussian function generalized by introducing parameters $\alpha 1$ and $\alpha 2$ representing orders in the expressions of the exponent parts.

For example, when the values of the parameters $\alpha 1$ and $\alpha 2$ are 2, the joined tail function is a joined half Gaussian function. When the values of the parameters $\alpha 1$ and $\alpha 2$ are 1, the exponent part is linear and the joined tail function is a combination of exponential functions. Qualitatively, the parameters $\alpha 1$ and $\alpha 2$ may be said to be parameters that adjust the roundness of distribution curves. Alternatively, the parameters $\alpha 1$ and $\alpha 2$ may be said to be the orders of the exponent parts of function curves including exponential forms.

The information processing apparatus of the present embodiment determines parameters such that the joined tail function matches ion implantation distribution data. The determination of the parameters will be referred to as fitting. However, the determination will sometimes be also referred to as "matching", instead of "fitting". The information processing apparatus then estimates ($\gamma$, $\beta$) from the joined tail function defined by the determined parameters and generates a Pearson distribution. In practice, the information processing apparatus uses a second joined tail function, which is a further generalized version of Equation 12, in the fitting as will be described later.

Generalized forms of moments for the joined tail function in Equation 12 are illustrated by Equations 13 to 17. The definitions of the first- to fourth-order moments are given here.

$$\int_0^\infty \exp\left[-\frac{1}{2}\left(\frac{x}{\Delta R_p}\right)^\alpha\right]dx = \Gamma\left(1+\frac{1}{\alpha}\right)\Delta R_p \quad \text{[Expression 13]}$$

$$\int_0^\infty x\exp\left[-\frac{1}{2}\left(\frac{x}{\Delta R_p}\right)^\alpha\right]dx = \frac{\Gamma\left(\frac{2}{\alpha}\right)}{\alpha}\Delta R_p^2 \quad \text{[Expression 14]}$$

$$\int_0^\infty x^2\exp\left[-\frac{1}{2}\left(\frac{x}{\Delta R_p}\right)^\alpha\right]dx = \frac{\Gamma\left(\frac{3}{\alpha}\right)}{\alpha}\Delta R_p^3 \quad \text{[Expression 15]}$$

$$\int_0^\infty x^3\exp\left[-\frac{1}{2}\left(\frac{x}{\Delta R_p}\right)^\alpha\right]dx = \frac{\Gamma\left(\frac{4}{\alpha}\right)}{\alpha}\Delta R_p^4 \quad \text{[Expression 16]}$$

$$\int_0^\infty x^4\exp\left[-\frac{1}{2}\left(\frac{x}{\Delta R_p}\right)^\alpha\right]dx = \frac{\Gamma\left(\frac{5}{\alpha}\right)}{\alpha}\Delta R_p^5 \quad \text{[Expression 17]}$$

From Equations 13 to 17, the integral relating to the moments may be calculated according to Equations 18 to 31.

$$\frac{\int xN(x)dx}{\int N(x)dx} = \frac{-\frac{\Gamma\left(\frac{2}{\alpha_1}\right)}{\alpha_1}\Delta R_{p1}^2 + \frac{\Gamma\left(\frac{2}{\alpha_2}\right)}{\alpha_2}\Delta R_{p2}^2}{\Gamma\left(1+\frac{1}{\alpha_1}\right)\Delta R_{p1} + \Gamma\left(1+\frac{1}{\alpha_2}\right)\Delta R_{p2}} \quad \text{[Expression 18]}$$

$$= \frac{-\frac{\Gamma\left(\frac{2}{\alpha_1}\right)}{\alpha_1} + \frac{\Gamma\left(\frac{2}{\alpha_2}\right)}{\alpha_2}r^2}{\Gamma\left(1+\frac{1}{\alpha_1}\right) + \Gamma\left(1+\frac{1}{\alpha_2}\right)r}\Delta R_{p1}$$

$$= f_1(r)\Delta R_{p1}$$

Here, f1(r) is defined by Equation 19:

$$f_1(r) = \frac{-\frac{\Gamma\left(\frac{2}{\alpha_1}\right)}{\alpha_1} + \frac{\Gamma\left(\frac{2}{\alpha_2}\right)}{\alpha_2}r^2}{\Gamma\left(1+\frac{1}{\alpha_1}\right) + \Gamma\left(1+\frac{1}{\alpha_2}\right)r} \quad \text{[Expression 19]}$$

$$\frac{\int x^2 N(x)dx}{\int N(x)dx} = \frac{\frac{\Gamma\left(\frac{3}{\alpha_1}\right)}{\alpha_1}\Delta R_{p1}^3 + \frac{\Gamma\left(\frac{3}{\alpha_2}\right)}{\alpha_2}\Delta R_{p2}^3}{\Gamma\left(1+\frac{1}{\alpha_1}\right)\Delta R_{p1} + \Gamma\left(1+\frac{1}{\alpha_2}\right)\Delta R_{p2}} \quad \text{[Expression 20]}$$

$$= \frac{\frac{\Gamma\left(\frac{3}{\alpha_1}\right)}{\alpha_1} + \frac{\Gamma\left(\frac{3}{\alpha_2}\right)}{\alpha_2}r^3}{\Gamma\left(1+\frac{1}{\alpha_1}\right) + \Gamma\left(1+\frac{1}{\alpha_2}\right)r}\Delta R_{p1}^2$$

$$= f_2(r)\Delta R_{p1}^2$$

Here, f2(r) is defined by Equation 21:

$$f_2(r) = \frac{\frac{\Gamma\left(\frac{3}{\alpha_1}\right)}{\alpha_1} + \frac{\Gamma\left(\frac{3}{\alpha_2}\right)}{\alpha_2} r^3}{\Gamma\left(1+\frac{1}{\alpha_1}\right) + \Gamma\left(1+\frac{1}{\alpha_2}\right) r}$$ 
[Expression 21]

$$\frac{\int x^3 N(x)dx}{\int N(x)dx} = \frac{-\frac{\Gamma\left(\frac{4}{\alpha_1}\right)}{\alpha_1}\Delta R_{p1}^4 + \frac{\Gamma\left(\frac{4}{\alpha_2}\right)}{\alpha_2}\Delta R_{p2}^4}{\Gamma\left(1+\frac{1}{\alpha_1}\right)\Delta R_{p1} + \Gamma\left(1+\frac{1}{\alpha_2}\right)\Delta R_{p2}}$$

$$= \frac{-\frac{\Gamma\left(\frac{4}{\alpha_1}\right)}{\alpha_1} + \frac{\Gamma\left(\frac{4}{\alpha_2}\right)}{\alpha_2} r^4}{\Gamma\left(1+\frac{1}{\alpha_1}\right) + \Gamma\left(1+\frac{1}{\alpha_2}\right) r} \Delta R_{p1}^3$$

$$= f_3(r)\Delta R_{p1}^3$$
[Expression 22]

Here, f3(r) is defined by Equation 23:

$$f_3(r) = \frac{-\frac{\Gamma\left(\frac{4}{\alpha_1}\right)}{\alpha_1} + \frac{\Gamma\left(\frac{4}{\alpha_2}\right)}{\alpha_2} r^4}{\Gamma\left(1+\frac{1}{\alpha_1}\right) + \Gamma\left(1+\frac{1}{\alpha_2}\right) r}$$
[Expression 23]

$$\frac{\int x^4 N(x)dx}{\int N(x)dx} = \frac{\frac{\Gamma\left(\frac{5}{\alpha_1}\right)}{\alpha_1}\Delta R_{p1}^5 + \frac{\Gamma\left(\frac{5}{\alpha_2}\right)}{\alpha_2}\Delta R_{p2}^5}{\Gamma\left(1+\frac{1}{\alpha_1}\right)\Delta R_{p1} + \Gamma\left(1+\frac{1}{\alpha_2}\right)\Delta R_{p2}}$$

$$= \frac{\frac{\Gamma\left(\frac{5}{\alpha_1}\right)}{\alpha_1} + \frac{\Gamma\left(\frac{5}{\alpha_2}\right)}{\alpha_2} r^5}{\Gamma\left(1+\frac{1}{\alpha_1}\right) + \Gamma\left(1+\frac{1}{\alpha_2}\right) r} \Delta R_{p1}^4$$

$$= f_4(r)\Delta R_{p1}^4$$
[Expression 24]

Here, f4(r) is defined by Equation 25:

$$f_4(r) = \frac{\frac{\Gamma\left(\frac{5}{\alpha_1}\right)}{\alpha_1} + \frac{\Gamma\left(\frac{5}{\alpha_2}\right)}{\alpha_2} r^5}{\Gamma\left(1+\frac{1}{\alpha_1}\right) + \Gamma\left(1+\frac{1}{\alpha_2}\right) r}$$
[Expression 25]

Therefore moment parameters of the joined tail function $R_p$, $\Delta R_p^2$, $\lambda_3$, and $\lambda_4$ are given by Equations 26 to 29:

$$R_p = \frac{\int xN(x)dx}{\int N(x)dx}$$
$$= f_1(r)\Delta R_{p1}$$
[Expression 26]

$$\Delta R_p^2 = \frac{\int (x-R_p)^2 N(x)dx}{\int N(x)dx}$$

$$= \frac{\int x^2 N(x)dx - 2R_p \int xN(x)dx + R_p^2 \int N(x)dx}{\int N(x)dx}$$

$$= f_2(r)\Delta R_{p1}^2 - R_p^2$$

$$= [f_2(r) - f_1(r)^2]\Delta R_{p1}^2$$
[Expression 27]

$$\mu_3 = \frac{\int (x-R_p)^3 N(x)dx}{\int N(x)dx}$$

$$= \frac{\int x^3 N(x)dx - 3R_p \int x^2 N(x)dx + 3R_p^2 \int xN(x)dx - R_p^3 \int N(x)dx}{\int N(x)dx}$$

$$= \frac{\int x^3 N(x)dx}{\int N(x)dx} - 3R_p \frac{\int x^2 N(x)dx}{\int N(x)dx} + 2R_p^3$$

$$= f_3(r)\Delta R_{p1}^3 - 3f_1(r)\Delta R_{p1} f_2(r)\Delta R_{p1}^2 + 2f_1(r)^3 \Delta R_{p1}^3$$

$$= [f_3(r) - 3f_1(r)f_2(r) + 2f_1(r)^3]\Delta R_{p1}^3$$
[Expression 28]

$$\mu_4 = \frac{\int (x-R_p)^4 N(x)dx}{\int N(x)dx}$$

$$= \frac{\int x^4 N(x)dx - 4R_p \int x^3 N(x)dx + 6R_p^2 \int x^2 N(x)dx - 4R_p^3 \int xN(x)dx + R_p^4}{\int N(x)dx}$$

$$= \frac{\int x^4 N(x)dx}{\int N(x)dx} - 4R_p \frac{\int x^3 N(x)dx}{\int N(x)dx} + 6R_p^2 \frac{\int x^2 N(x)dx}{\int N(x)dx} - 3R_p^4$$

$$= f_4(r)\Delta R_{p1}^4 - 4f_1(r)\Delta R_{p1} f_3(r)\Delta R_{p1}^3 + 6f_1(r)^2 \Delta R_{p1}^2 f_2(r)\Delta R_{p1}^2 - 3f_1(r)^4 \Delta R_{p1}^4$$

$$= [f_4(r) - 4f_1(r)f_3(r) + 6f_1(r)^2 f_2(r) - 3f_1(r)^4]\Delta R_{p1}^4$$
[Expression 29]

Therefore, γ and β are given by Equations 30 and 31, respectively.

$$\gamma(r) = \frac{\mu_3}{\Delta R_p^3}$$

$$= \frac{[f_3(r) - 3f_1(r)f_2(r) + 2f_1(r)^3]\Delta R_{p1}^3}{\{[f_2(r) - f_1(r)^2]\Delta R_{p1}^2\}^{\frac{3}{2}}}$$

$$= \frac{f_3(r) - 3f_1(r)f_2(r) + 2f_1(r)^3}{[f_2(r) - f_1(r)^2]^{\frac{3}{2}}}$$
[Expression 30]

-continued $$\beta(r) = \frac{\mu_4}{\Delta R_p^4}$$ [Expression 31]

$$= \frac{[f_4(r) - 4f_1(r)f_3(r) + 6f_1(r)^2 f_2(r) - 3f_1(r)^4]\Delta R_{p1}^4}{\{[f_2(r) - f_1(r)^2]\Delta R_{p1}^2\}^{\frac{4}{2}}}$$

$$= \frac{f_4(r) - 4f_1(r)f_3(r) + 6f_1(r)^2 f_2(r) - 3f_1(r)^4}{[f_2(r) - f_1(r)^2]^2}$$

Figure 8:
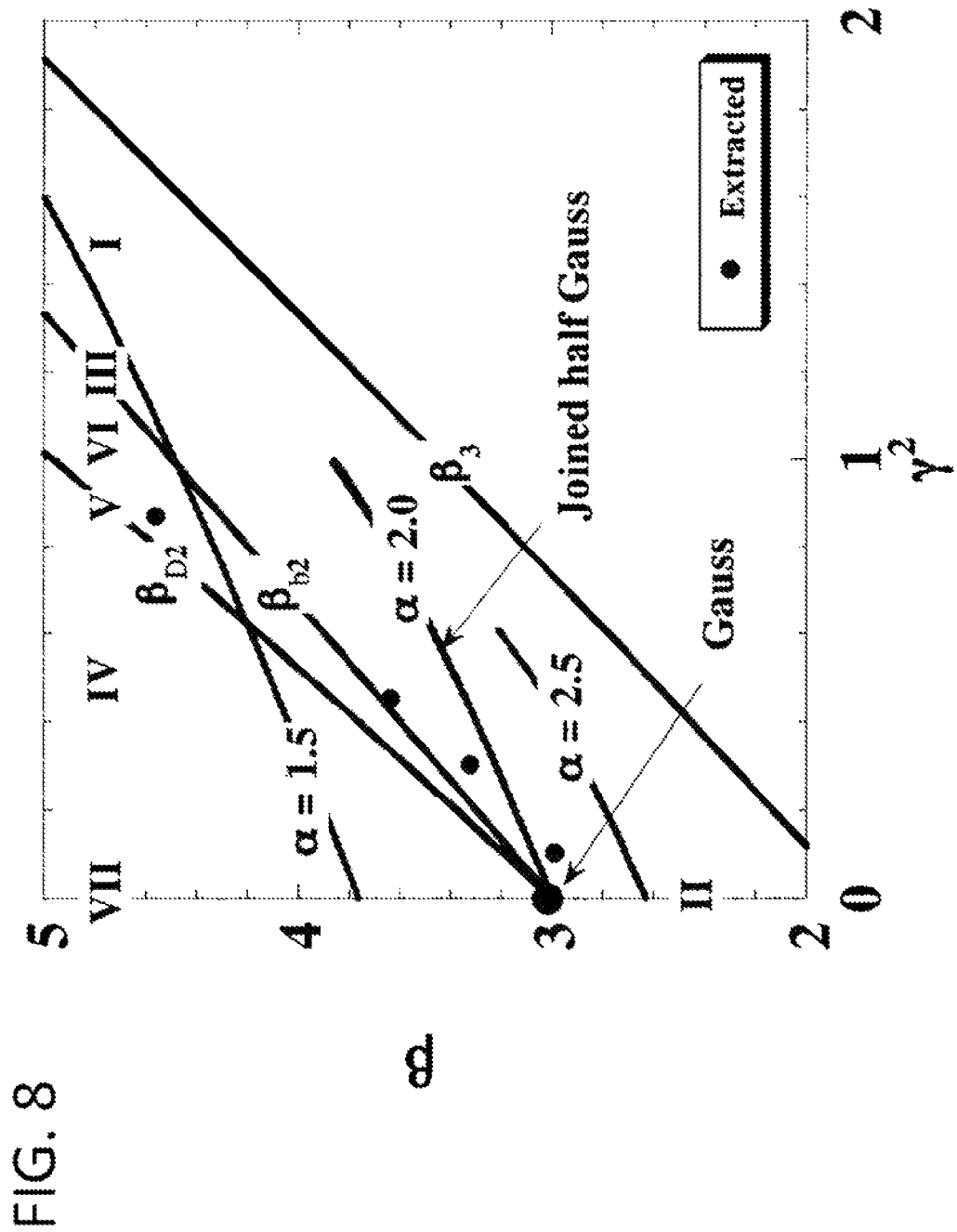
FIG. 8 is a diagram illustrating curves that $(\gamma, \beta)$ may take in a joined tail function.

That is, when the ratio r in Equation 5 is determined, $\gamma$ and $\beta$ of the joined tail function are uniquely determined. FIG. 8 illustrates possible curves of ($\gamma$, $\beta$) in the joined tail function. For simplicity, $\alpha1=\alpha2=\alpha$ in FIG. 8. Here, curves of $\alpha=1.5$, 2 and 2.5 are illustrated. When $\alpha=2$, the joined tail function is a joined half Gaussian function. Description of symbols in FIG. 8 that also appear in FIG. 6 will be omitted.

As $\alpha1$ increases, the peak region becomes rounder and $\beta$ decreases. The range of values that $\gamma^2$ may take also decreases. It may be expected that when the value of $\alpha1$, that is, the shape of distribution is determined, ($\gamma$, $\beta$) limited according to the ratio r on each line will be selected. Here, the limit values are estimated as follows.

When r=1, the joined tail function is symmetric and therefore $\gamma$ will be equal to 0. Substituting r=1 in Equation 30 shows that $\gamma=0$.

$$\gamma(1) = \frac{f_3(1) - 3f_1(1)f_2(1) + 2f_1(1)^3}{[f_2(1) - f_1(1)^2]^{\frac{3}{2}}}$$ [Expression 32]

$$= 0$$

Here, $\beta$ takes the minimum value, $\beta\min=\beta(1)$.

The maximum absolute value of $\gamma$, $\gamma$max, will result when r=0. That is, $\gamma\max^2=[\gamma(r=0)]^2$.

Figure 9:
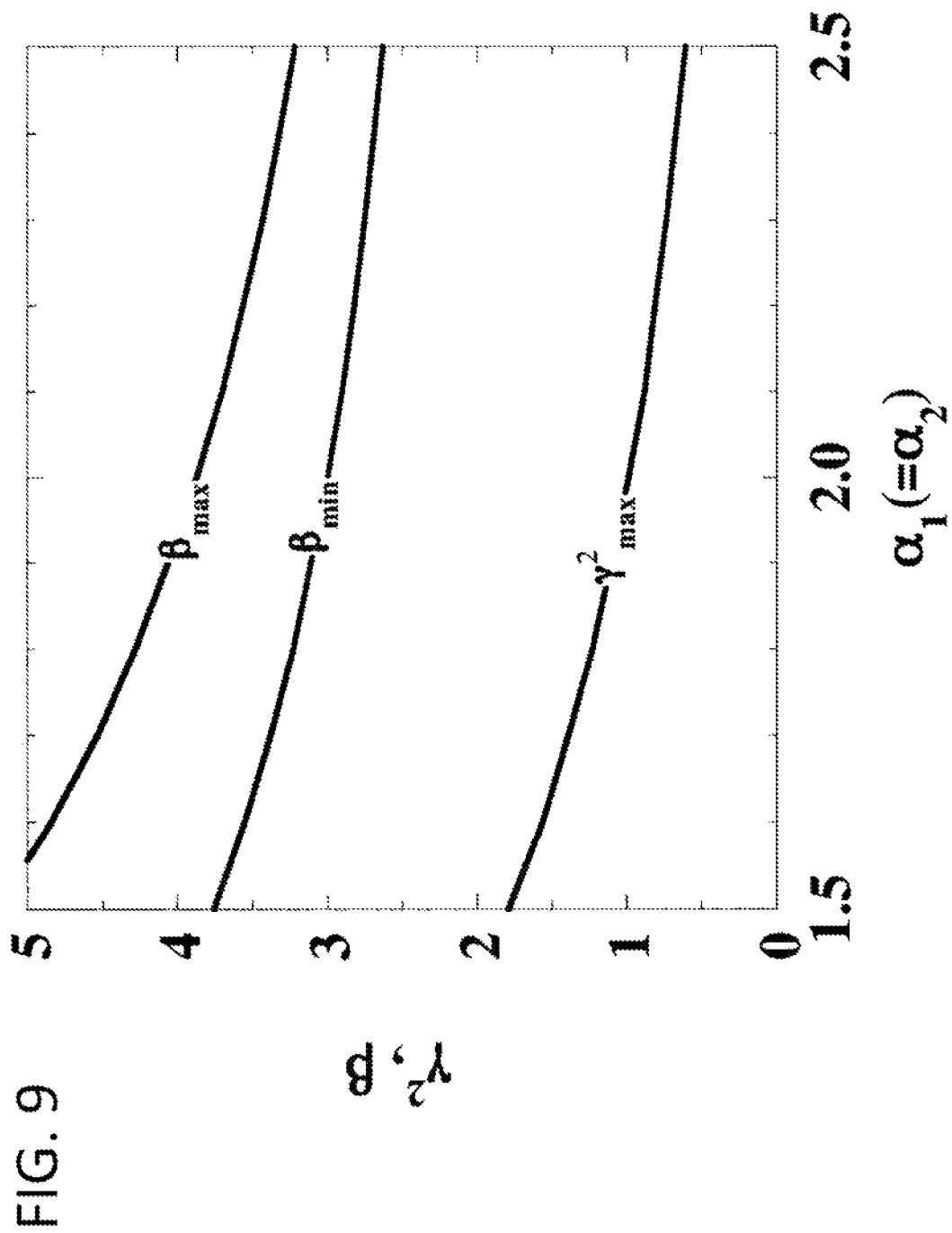
FIG. 9 illustrates $\gamma^2$ and $\beta$ as a function of $\alpha 1$ ($=\alpha 2$)

FIG. 9 illustrates $\gamma^2$ and $\beta$ as a function of $\alpha1$ (=$\alpha2$).

Here, each of $\Delta R_{p1}$ and $\Delta R_{p2}$ is the distance from the peak at which concentration is $1/e^2$ of the peak concentration. Accordingly, $\Delta R_{p1}$ and $\Delta R_{p2}$ in Equation 12 directly relates to the shape of a region very close to the peak and may not be the distances that represent the shape of a whole ion implantation distribution. Therefore, when the joined tail function is fitted to an ion implantation distribution, a function is used that does not fix the fitting range to the distance at which the concentration is $1/e^2$ of the peak concentration. Specifically, the function in Equation 33 given below is used when in practice the joined tail function is fitted to an ion implantation distribution. Equation 33 is a variation of Equation 12 and is referred to as a second joined tail function. The function of one of the regions ($x \leq R_{pm}$ and $R_{pm} < x$) of Equation 33 represents a first function and the other represents a second function.

$$N(x) = \begin{cases} N_m \exp\left[-\ln(\zeta_1)\left(\frac{R_{pm} - x}{L_1}\right)^{\alpha_1}\right] & x \leq R_{pm} \\ N_m \exp\left[-\ln(\zeta_2)\left(\frac{x - R_{pm}}{L_2}\right)^{\alpha_2}\right] & x > R_{pm} \end{cases}$$ [Expression 33]

In the second joined tail function, the distances from the peak concentration position ($R_{pm}$) at which the concentrations are $1/\zeta1$ and $1/\zeta2$ of the peak concentration $N_m$ are L1 and L2, respectively. Therefore, the range of ion implantation distribution data to which the second joined tail function is to be fitted may be flexibly set by using $1/\zeta1$ and $1/\zeta2$. One of the parameter sets ($N_m$, $R_{pm}$, L1, $\zeta1$, $\alpha1$) and ($N_m$, $R_{pm}$, L2, $\zeta2$, $\alpha2$) in Equation 33 represents the first function parameter set and the other represents the second function parameter set.

By imposing the condition that the concentrations at the distances $\Delta R_{p1}$ and $\Delta R_{p2}$ be $1/e^2$ on $\Delta R_{p1}$ and $\Delta R_{p2}$ in the second joined tail function, a function fitted using the second joined tail function may be obtained as the joined tail function in Equation 12. From the condition that the concentration at the distances $\Delta R_{p1}$ and $\Delta R_{p2}$ be $1/e^2$, the relationship between the distance $\Delta R_{p1}$, $\Delta R_{p2}$ and the distance L1, L2 may be given by Equation 34. That is, under the condition of Equation 34, the second joined tail function is the same as the joined tail function in Equation 12.

$$\Delta R_{p1,2} = \frac{1}{[2\ln(\zeta_{1,2})]^{\frac{1}{\alpha_{1,2}}}} L_{1,2}$$ [Expression 34]

Figure 10:
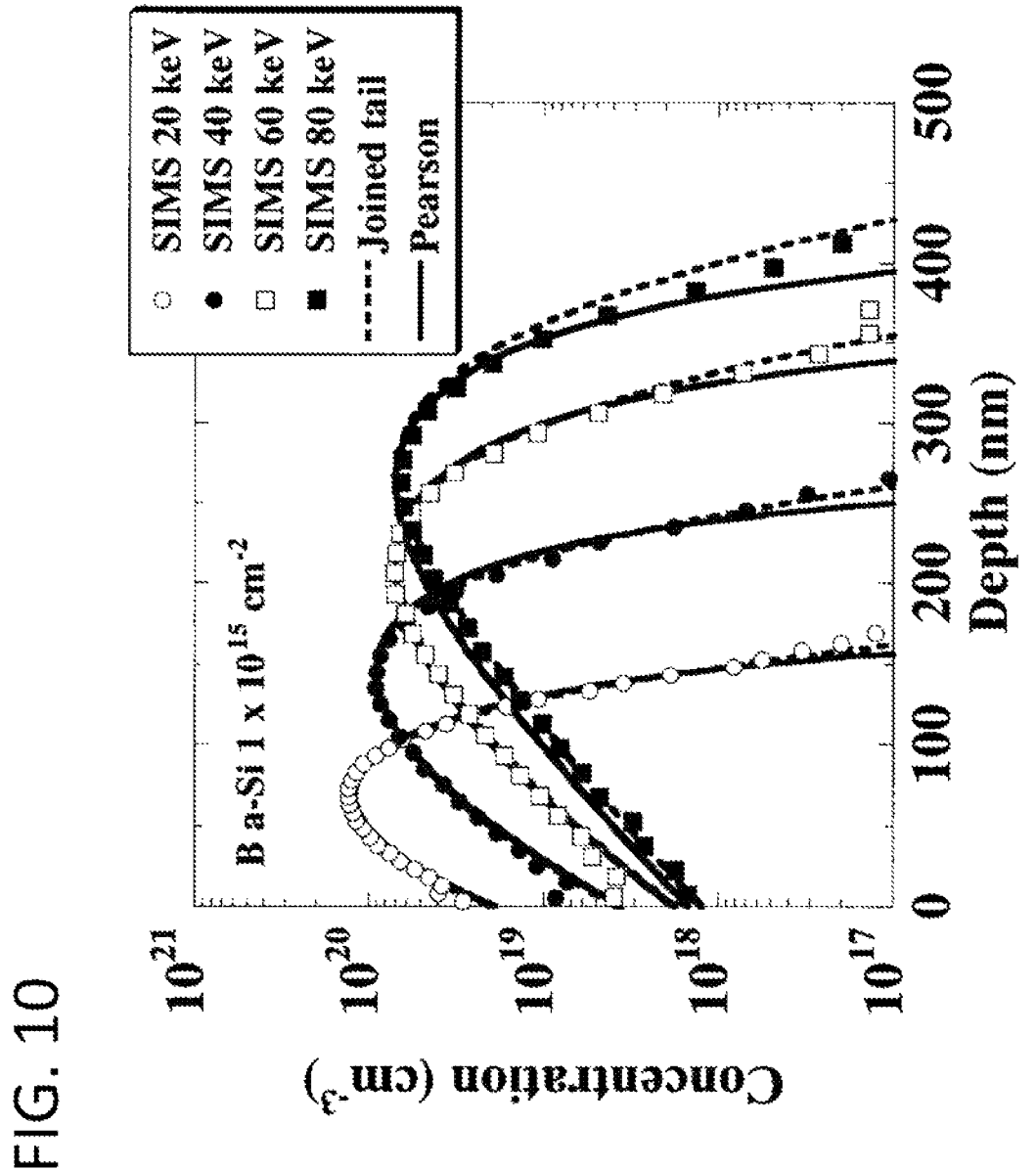
FIG. 10 is a diagram illustrating an example in which after fitting a joined tail function, the moments of the joined tail function have been calculated and then a Pearson distribution have been generated based on the moment parameters.

FIG. 10 illustrates an example in which after fitting the joined tail function, the moments of the joined tail function have been calculated and Pearson distributions have been generated based on the moment parameters. A joined tail function and a Pearson function that have the same moments almost mach each other if each of the functions has a relatively high symmetry. For example, the 20-keV ion implantation distribution in FIG. 10 has a relatively high symmetry.

However, as asymmetry increases, a difference arises on the steep side of the distribution (in the case of boron (B), on the deeper side of the substrate). This is probably because the domain of the joined tail function differs from that of the Pearson distribution. To build a database of Pearson distributions, fitting of the Pearson distributions is preferable to fitting of joint tail functions. Accordingly, it is desirable that the joined tail function be used as an intermediary function to change parameters. It is also desirable that fitting is performed so that the Pearson distribution generated on the basis of parameters obtained from calculation of the moments of the joined tail function matches the ion implantation distribution. The purpose of storing parameters of Pearson distributions to build a database is to fit Pearson distributions. Accordingly, when parameters of a Pearson distribution are stored, a certain amount of error is allowed in fitting of the joined tail function itself.

Figure 11:
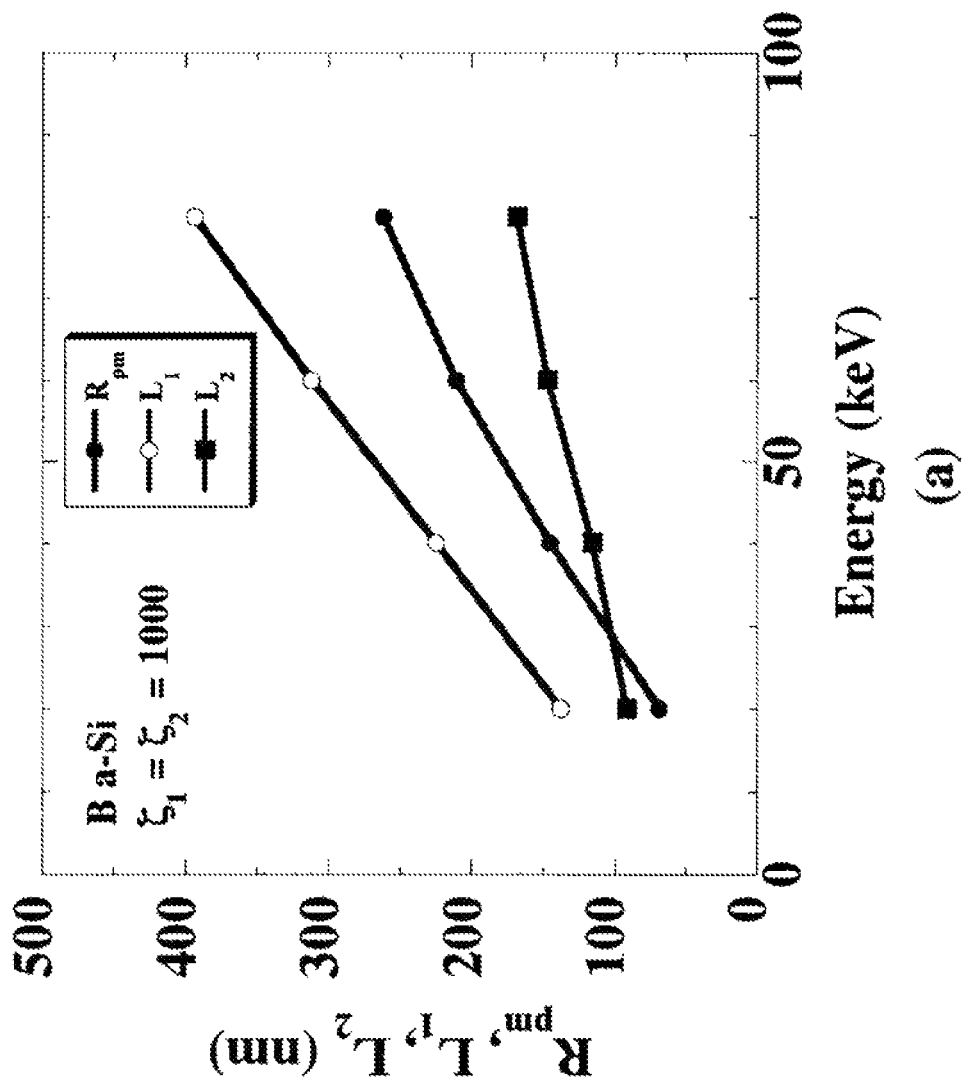
FIG. 11 is a diagram illustrating an example of energy dependence of parameters $R_{pm}$, L1 and L2 of a joined tail function.

FIG. 11 illustrates an example of energy dependences of the parameters $R_{pm}$, L1 and L2 of the joined tail function. The parameters $R_{pm}$ and L1 nearly linearly depend on energy. The parameter L2 also nearly linearly depends on energy. However, L2 are not strongly dependent on $R_{pm}$ and L1.

Figure 12:
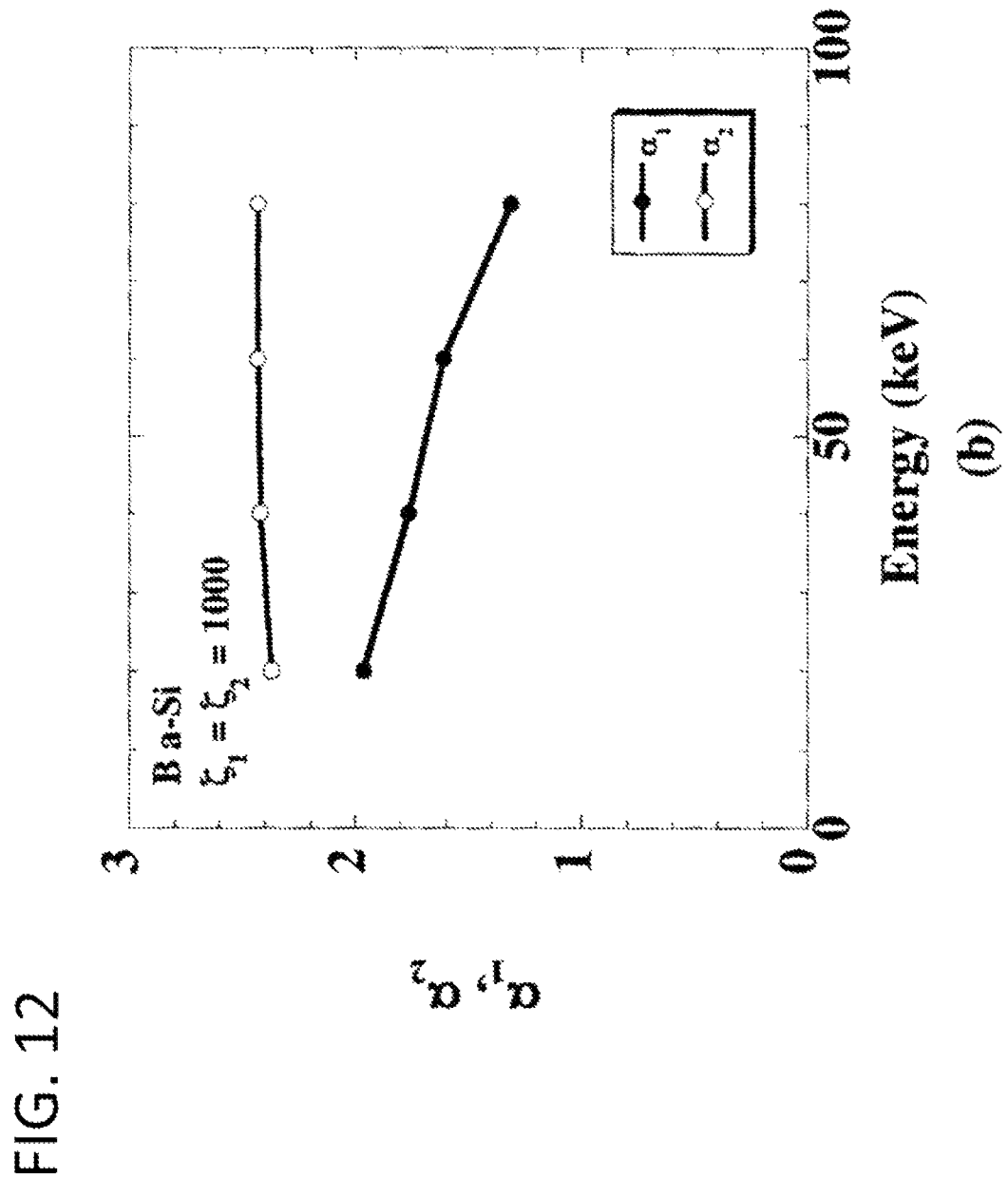
FIG. 12 is a diagram illustrating an example of energy dependence of parameters $\alpha 1$ and $\alpha 2$ of a joined tail function.

FIG. 12 illustrates an example of energy dependences of the parameters $\alpha1$ and $\alpha2$ of the joined tail function. The parameter $\alpha1$ decreases with increasing energy. That is, the shape approaches the shape of an exponential ($\alpha=1$) from the shape of a Gaussian function ($\alpha=2$). On the other hand, $\alpha2$ is little dependent on energy but slightly increases with energy. The values of the parameters directly relate to the shapes of distributions and have little arbitrariness.

Figure 13:
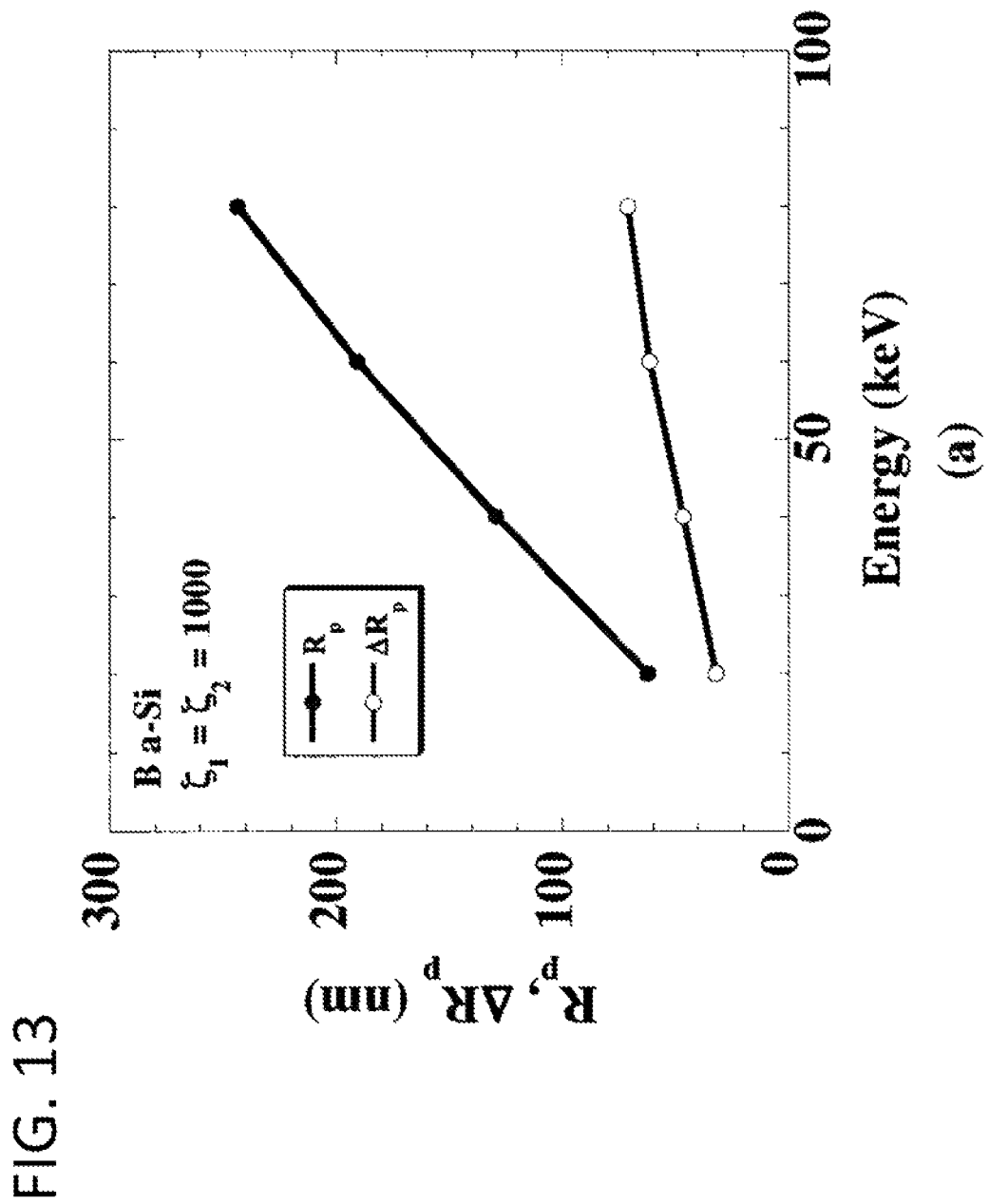
FIG. 13 is a diagram illustrating energy dependence of $R_p$ and $\Delta R_p$ calculated from the joined tail function.

FIG. 13 illustrates energy dependences of $R_p$ and $\Delta R_p$, calculated from the joined tail function. FIG. 13 is equivalent to an ion implantation distribution data to which the Pearson distribution is fitted.

Figure 14:
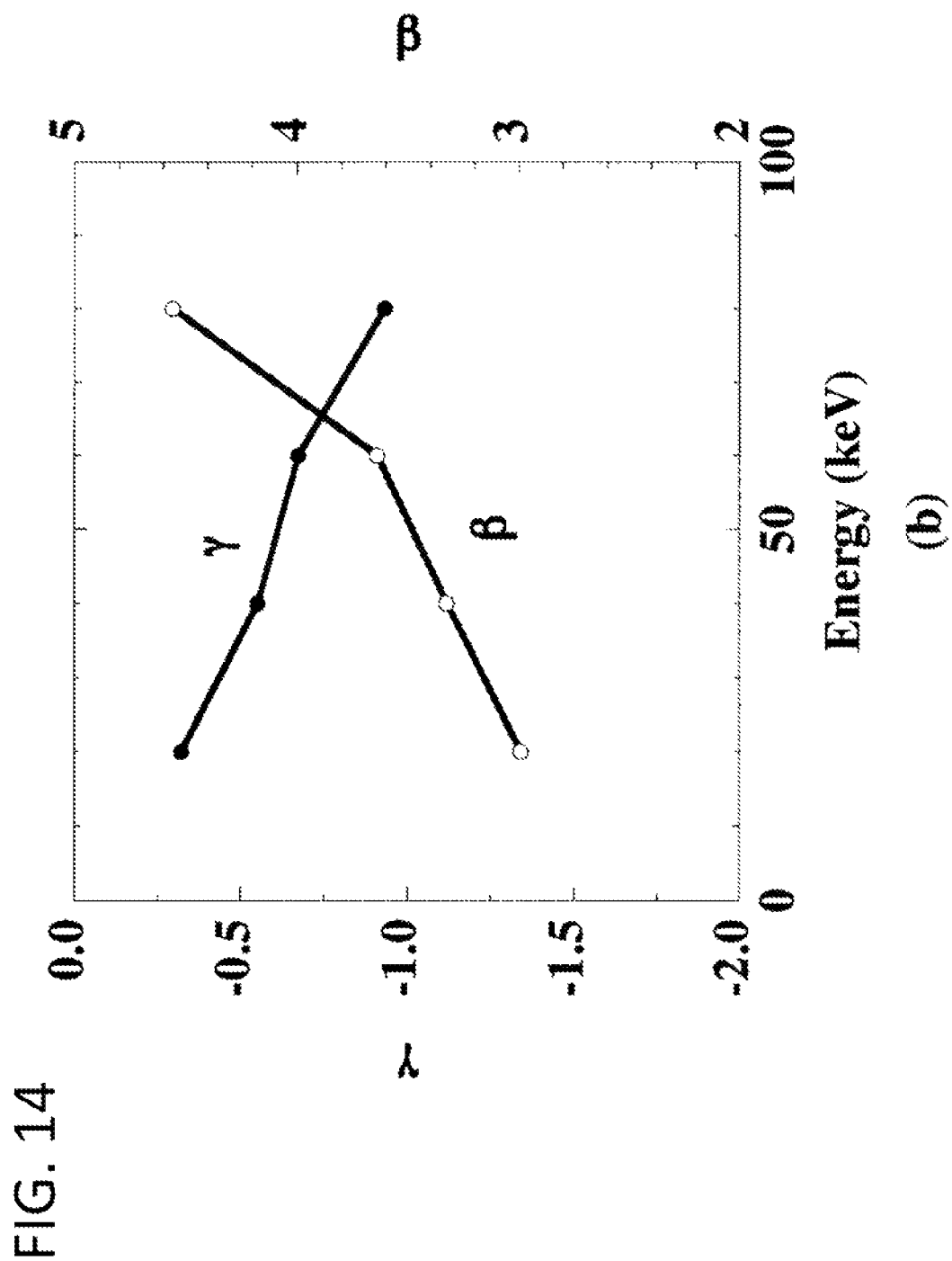
FIG. 14 is a diagram illustrating energy dependence of $\gamma$ and $\beta$ calculated from the joined function.

FIG. 14 illustrates energy dependences of $\gamma$ and $\beta$, calculated from the joined tail function. As energy increases, $\gamma^2$ monotonically increases. Here, $\gamma$ monotonically decreases whereas $\beta$ monotonically increases as expected. Thus the arbitrariness of $\gamma$ and $\beta$ calculated from the joined tail function are low. That is, when ion acceleration energy is determined, γ and β may be readily uniquely determined. In addition, energy dependences of γ and β calculated from the joined tail function qualitatively agree with those theoretically estimated.

FIG. 8 illustrates γ and β extracted as described above in the $\gamma^2$-β plane. The black dots, as labeled "Extracted" in the legend, are the extracted γ and β. It may be seen from the results of the extraction that the ion implantation distribution of interest is in the regions of Pearson I, III and VI. Since the shape of the highly asymmetrical ion implantation distribution at high energy is skewed from the Gaussian function, the ion implantation distribution is difficult to approximate by the joined half Gaussian function. On the other hand, the joined tail function relatively readily represents the ion implantation distribution that is difficult to approximate by the joined half Gaussian function.

First Embodiment

Figure 15:
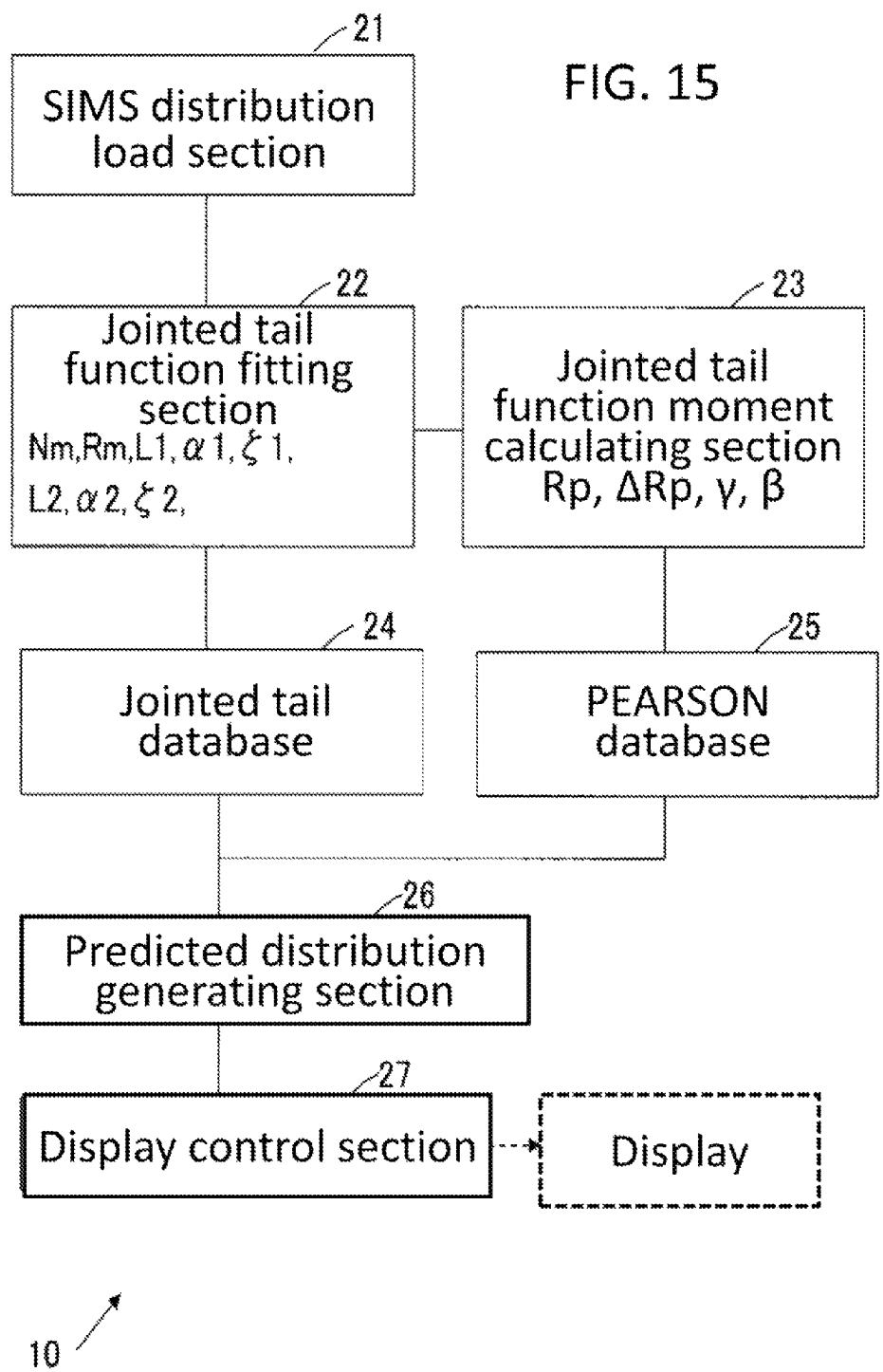
FIG. 15 is a block diagram illustrating functional blocks of an information processing apparatus according to one embodiment.

An information processing apparatus 10 according to a first embodiment will be described with reference to FIGS. 15 through 18.
<System Configuration>
FIG. 15 is a functional block diagram of an information processing apparatus 10 according to the first embodiment. The information processing apparatus 10 executes a computer program loaded on a memory and provides functions of a SIMS distribution load section 21, a joined tail function fitting section 22, a joined tail function moment calculating section 23, a joined tail database 24, a Pearson database 25, a predicted distribution generating section 26, and a display control section 27. The SIMS distribution load section 21 will be simply referred to as the load section 21.

The load section 21 represents means for inputting a distribution data series and data describing conditions under which the distribution data series was obtained. The joined tail function fitting section 22 represents first adjusting means and second adjusting means. The joined tail function moment calculating section 23 represents means for calculating a characteristic coefficient. The joined tail function moment calculating section 23 also represents means for storing the characteristic coefficient in a database. The predicted distribution generating section 26 represents means for interpolating from a characteristic coefficient stored in the database and means for calculating distribution data.

The load section 21 reads ion implantation distribution data such as ion concentrations measured using SIMS from a data file on an external storage. The data file on the external storage may be specified by a user input, for example.

The joined tail function fitting section 22 adjusts parameters of a joined tail function to fit the joined tail function to ion implantation distribution data read from the load section 21. The term "fitting" refers to adjusting parameters of a joined tail function so that the error between ion implantation distribution data and the joined tail function is minimized in a predetermined range. The joined tail function fitting section 22 will be simply referred to as the fitting section 22. The fitting section 22 determines parameters Nm, Rm, L1, α1, ζ1, L2, α2, and ζ2 for ion implantation distribution data. The fitting section 22 stores the parameters Nm, Rm, L1, α1, ζ1, L2, α2, and ζ2 in the joined tail database 24 along with data describing the conditions under which the ion implantation distribution data was obtained, such as the material of the substrate, ion species, and acceleration energy. The part of the fitting section 22 that adjusts L1, α1 and ζ1 represents the first adjusting means whereas the part that adjusts L2, α2, and ζ2 represents the second adjusting means.

The joined tail database 24 stores condition data describing conditions, such as the material of the substrate, ion species and acceleration energy, under which ion implantation distribution data was obtained in association with the parameter set (Nm, Rm, L1, α1, ζ1, L2, α2, and ζ2).

The joined tail function moment calculating section 23 calculates moments from a joined tail function having parameters determined by the fitting section 22. The joined tail function moment calculating section 23 also calculates moment parameters Rp2, ΔRp2, γ2 and β2 from the calculated moments. The joined tail function moment calculating section 23 stores the moment parameters of a Pearson distribution Rp2, ΔRp2, γ2 and β2 in the Pearson database 25 along with the condition data describing conditions under which the ion implantation distribution data was obtained, such as the material of the substrate, ion species and acceleration energy. The joined tail function moment calculating section 23 will be simply referred to as the moment calculating section 23. The moment parameters of a Pearson distribution will be sometimes simply referred to as the parameters of a Pearson distribution.

The Pearson database 25 stores condition data describing the conditions under which ion implantation distribution data was obtained, that is, the material of the substrate, ion species and acceleration energy, in association with the parameters ($R_p2$, $\Delta R_p2$, γ2 and β2) of a Pearson distribution.

The predicted distribution generating section 26 receives data on a substrate material, ion species and acceleration energy specified by a user. The predicted distribution generating section 26 searches the Joined tail database 24 for acceleration energy close to the specified acceleration energy for the specified substrate material and ion species. The predicted distribution generating section 26 interpolates parameters of a joined tail function corresponding to the specified acceleration energy on the basis of a parameter corresponding to the acceleration energy found in the joined tail database 24. The predicted distribution generating section 26 generates a joined tail function with the interpolated parameters and outputs a distribution based on the joined tail function to the display control section 27.

Similarly, the predicted distribution generating section 26 searches the Pearson database 25 for acceleration energy close to the specified acceleration energy. The predicted distribution generating section 26 interpolates parameters of a Pearson function corresponding to the specified acceleration energy on the basis of a parameter corresponding to the acceleration energy found in the Pearson database 25. The predicted distribution generating section 26 generates a Pearson function with the interpolated parameters and outputs a Pearson distribution to the display control section 27.

The display control section 27 generates an image of a curve from the value of a Pearson function generated by the predicted distribution generating section 26 and outputs the image to a display device.

Figure 16:
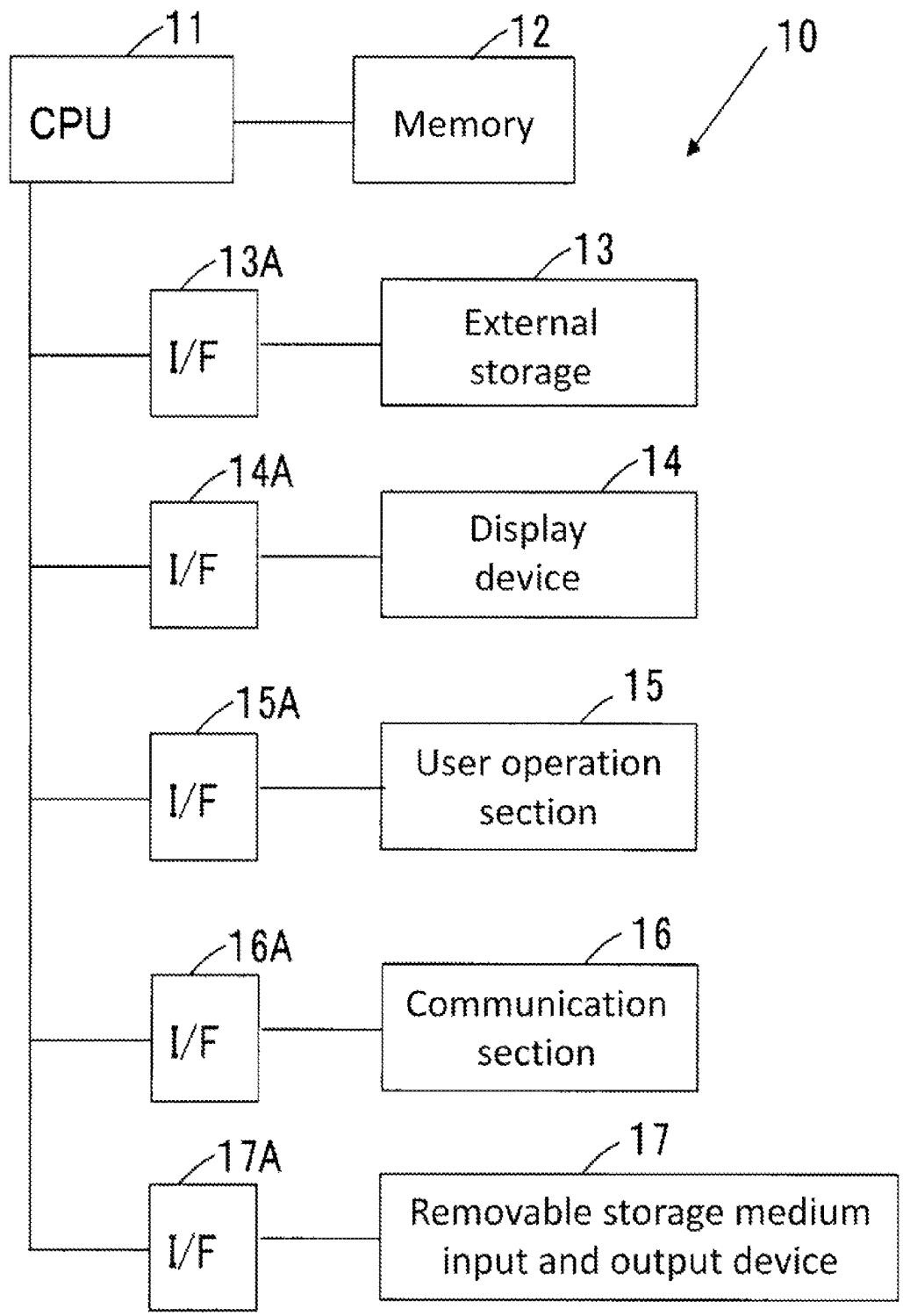
FIG. 16 is a diagram illustrating a hardware configuration of the information processing apparatus.

FIG. 16 illustrates an exemplary hardware configuration of the information processing apparatus 10. The information processing apparatus 10 includes a CPU 11, a memory 12, an external storage 13, a display device 13, a user operation section 15, a communication section 16, and a removable storage medium input and output device 17.

The CPU 11 executes a computer program loaded on the memory 12 in an executable manner and provides the functions of the information processing apparatus. The CPU 11 is not limited to a single core CPU but may include multiple cores.

The memory 12 stores a computer program to be executed by the CPU 11 and data to be processed by the CPU 11. The memory 12 may include a nonvolatile Read Only Memory (RAM) and a volatile Dynamic Random Access memory (DRAM).

The external storage 13 may be a hard disk driven by a hard disk drive or a memory such as a flash memory using a Solid State Drive (SSD). The external storage 13 stores a computer program to be loaded on the memory 12 or data to be processed by the CPU 11. The external storage 13 is connected to the CPU 11, through an interface 13A.

The interface 13A may be an interface such as a Universal Serial Bus (USB), Integrated Drive Electronics (IDE), Small Computer System Interface (SCSI), or Fibre Channel (FC) interface.

The display device 14 may be a liquid-crystal display or an electroluminescence panel. The display device 14 is connected to a CPU 11 through an interface 14A. The interface 14A may be a graphics module such as a Video Graphics Array (VGA) or an interface such as Digital Visual Interface (DVI).

The user operation section 15 is an input device such as a keyboard, a mouse, a touch panel, or an electrostatic touchpad. The electrostatic touchpad is a device that detects a user operation by the touch of a finger or the like on a flat pad and reacts the user operation to control the position and movement of a cursor on the display. For example, the movement of a finger of a user is detected by a change in the capacitance of electrodes under the flat pad. The user operation section 15 is connected to the CPU 11 through an interface 15A. The interface 15A may be a USB interface, for example.

The communication section 16, also called Network Interface Card (NIC), may be an interface such as a Local Area Network (LAN) interface, for example. The communication section 16 is connected to the CPU 11 through an interface 16A. The interface 16A may be an expansion slot connected to an internal bus of the CPU 11.

The removable storage medium input and output device 17 may be an input and output device for a medium such as a Compact Disc (CD), Digital Versatile Disk (DVD), Blu-ray disc, or flash memory card. The removable storage medium input and output device 17 is connected to the CPU 11 through an interface 17A. The interface 17A may be an interface such as a USB or SCSI interface, for example.

The information processing apparatus 10 illustrated in FIG. 16 is a single computer. However, the information processing apparatus 10 may be a system including multiple computers that cooperate together and execute different tasks.

<Process Flow>

Figure 17:
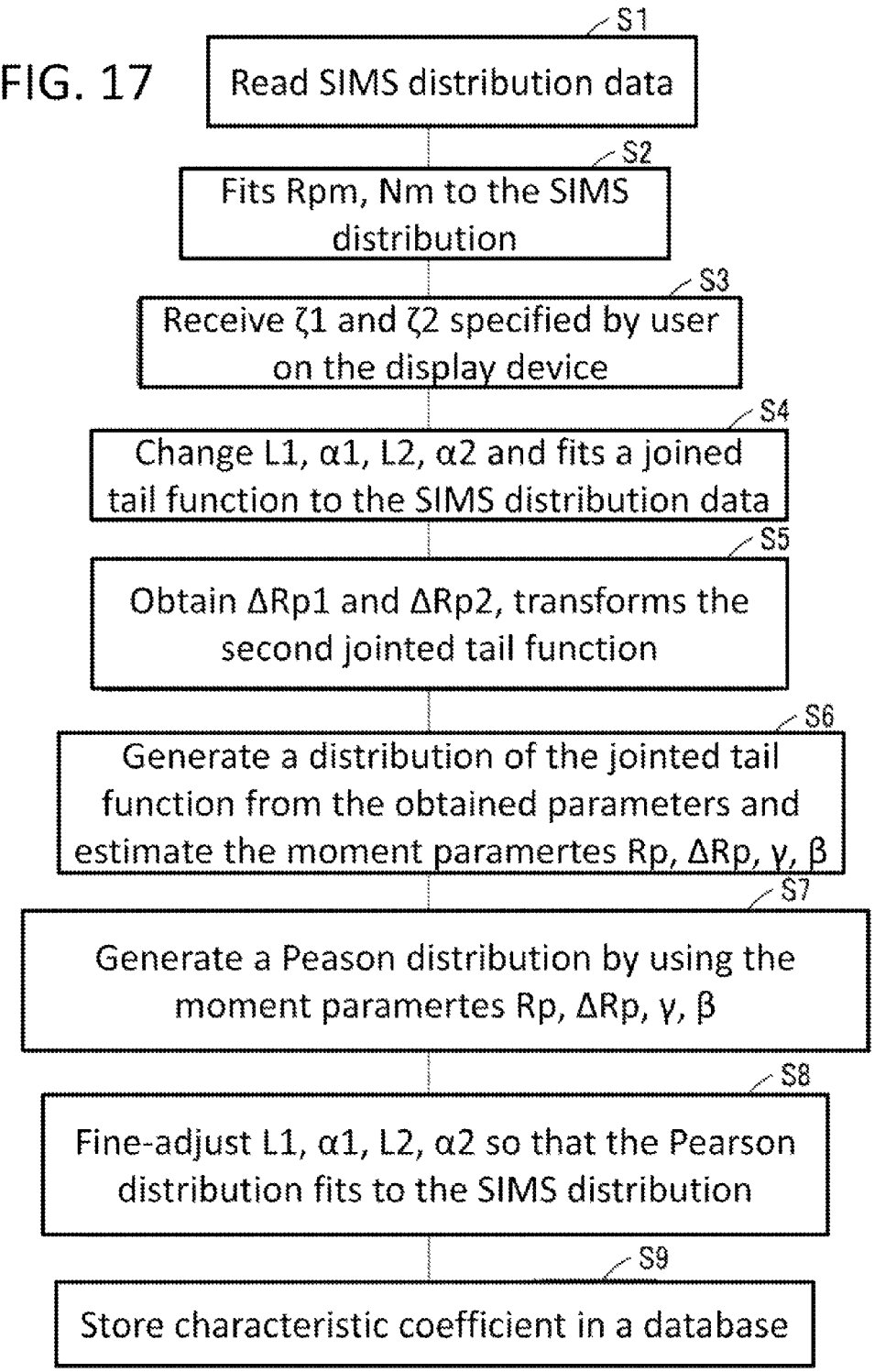
FIG. 17 is a flowchart illustrating a flow of process performed by the information processing apparatus 10.

FIG. 17 illustrates a flow of process performed by the information processing apparatus 10. The CPU 11 of the information processing apparatus 10 executes a computer program loaded on the memory 12 in an executable manner to perform the process illustrated in FIG. 17. First, the CPU 11 loads SIMS distribution data. That is, the CPU 11 reads SIMS distribution data from the external storage 13 or another computer on the network into the memory 12 through the communication section 16 onto the memory 12 (S1). The CPU 11 functions as the load section 21 illustrated in FIG. 15 to execute the computer program. The SIMS distribution data includes a data series (Xk, Ck) including a coordinate Xk in the depth direction in the substrate and a concentration Ck (k=1, . . . , N where N is equal to the number of pieces of data) and condition data. The condition data includes the material of the substrate, ion species, and acceleration energy, for example. While the data series is expressed in the form of (Xk, Ck) herein, the processing of the information processing apparatus 10 is not limited to the form of data series (Xk, Ck). For example, if the coordinate Xk in the depth direction in the substrate is defined by a fixed pitch $\Delta X$, the first coordinate X1 and the pitch $\Delta X$ may be held in the memory 12 or the external storage 13. If the first coordinate X1 and the pitch $\Delta X$ are held in the memory 12 or the external storage 13, the data series may include Ck alone. Similarly, if measurement points are fixed previously and the coordinate in the depth direction may be identified by a sequence number k indicating a position in the order of data, the data series may include Ck alone.

The CPU 11 then fits the peak Rpm and the peak concentration Nm to the data series (Xk, Ck) of the SIMS distribution data (k=1, . . . , N where N is equal to the number of pieces of the data) (S2). The data Ck corresponding to the peak concentration Nm represents an extreme value. The peak concentration may be called maximum concentration. The peak position Rp may be considered to represent the projected range of ions implanted in the substrate because the peak position Rp is a position where most ions implanted reach.

The CPU 11 then displays the data series (Xk, Ck) of the SIMS distribution data (k=1, . . . , N where N is equal to the number of pieces of the data) on the display device 14 and receives $\zeta 1$ and $\zeta 2$ specified by a user (S3). The user specifies a range, including the peak, to be processed in the data series (Xk, Ck) (k=1, . . . , N where N is equal to the number of pieces of data) of the SIMS distribution data displayed on the display device 14. By the specification, the user may limit the range to which a joined tail function is to be fitted. This is done because some input SIMS distribution data may include data undesirable as data to be processed such as singular data or noisy data.

The CPU 11 then changes L1, $\alpha 1$, L2 and $\alpha 2$ and fits a joined tail function to the data series (Xk, Ck) (k=1, . . . , N where N is equal to the number of pieces of data) of the SIMS distribution data (S4). For example, the CPU 11 may calculate an error ER (k)=N (Xk)−Ck from the concentration data value Ck and the value N (Xk) of the joined tail function at each coordinate point Xk and determine L1, $\alpha 1$, L2 and $\alpha 2$ that minimize the sum of squares of the error $\Sigma \{ER (k)\}^2$. Here, $\Sigma$ is the sum for k=1, . . . , N.

For example, first $\alpha 1$ and $\alpha 2$ may be fixed and then L1 and L2 may be determined. That is, L1 and L2 may be determined as the distances from the peak at which the concentrations are $1/\zeta 1$ and $1/\zeta 2$ of the peak concentration in the data series (Xk, Ck).

Then $\alpha 1$ and $\alpha 2$ are changed according to the determined L1 and L2 to obtain values that minimize the sum of squares of the error $\Sigma \{ER (k)\}^2$. The minimum and maximum values of $\alpha 1$ and $\alpha 2$ may be specified by the user. Then the bisection method may be used to repeatedly bisect values in the range between the minimum and maximum values in the direction in which an error decreases. For example, the interval from the minimum value to the maximum value is divided into two and the midpoint is extracted from each of the subintervals. The midpoint of the subinterval that provides the smaller error may be selected as the next point. Alternatively, an error may be calculated for every combination ($\alpha 1$, $\alpha 2$) in the interval from the minimum value to the maximum value in predetermined step sizes. Then the combination ($\alpha 1$, $\alpha 2$) that minimizes the sum of square of error $\Sigma \{ER (k)\}^2$ may be selected.

Figure 18:
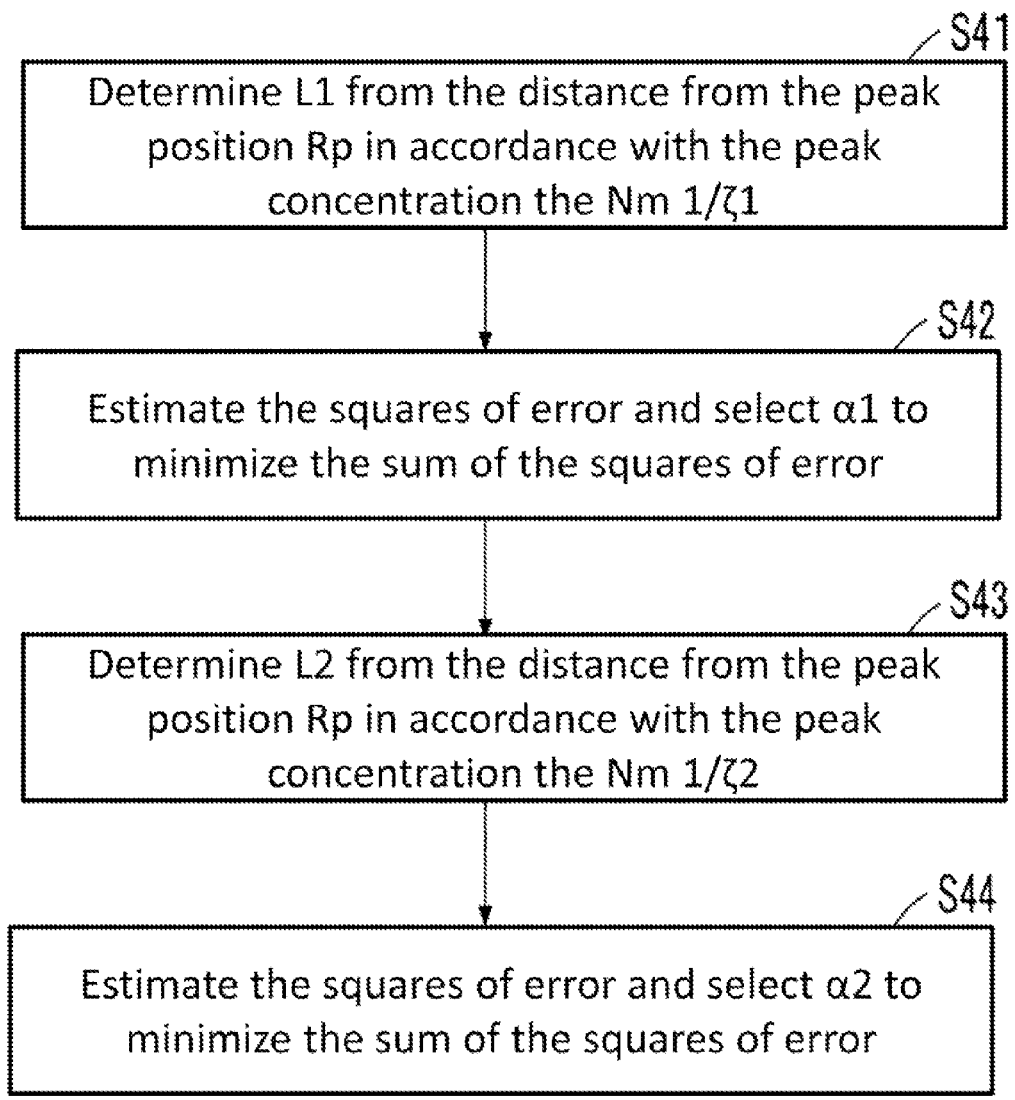
FIG. 18 is a flowchart illustrating details of an operation (S4 of FIG. 17) for changing L1, $\alpha 1$, L2 and $\alpha 2$ to fit a joined function to SIMS distribution data.

FIG. 18 illustrates details of the operation for changing L1, $\alpha 1$, L2 and $\alpha 2$ to fit the joined tail function to the SIMS distribution data (S4 of FIG. 17). In the example in FIG. 18, the CPU 11 first determines L1 from the distance from the peak position Rp at which the ratio of the concentration to the peak concentration Nm is 1/ζ1 (S41). The CPU 11 then selects α1 found to minimize the sum of squares of error Σ {ER (k)}² on the basis of the setting of α1 and estimation of error described above (S41). The CPU 11 performs S41 and S42 as the first adjusting means.

The CPU 11 then determines L2 from the distance from the peak position Rp at which the ratio of concentration to the peak concentration Nm is 1/ζ2 (S43). The CPU 11 then selects α2 found to minimize the sum of squares of error Σ {ER (k)}² according to the procedure similar to that for the α1 described above (S44). The CPU 11 performs S43 and S44 as the second adjusting means.

Returning to FIG. 17, the CPU 11 then obtains ΔRp1 and ΔRp2 from the relationship in Equation 34 and transforms the second joined tail function to a joined tail function (S5). In this way, the CPU 11 performs steps S4 and S5 of the computer program as the joined tail function fitting section 22 illustrated in FIG. 15.

The CPU 11 then generates a distribution of the joined tail function from the obtained parameters and estimates the moment parameters Rp, ΔRp, γ and β of the joined tail function (S6). More specifically, the CPU 11 calculates the integrals of Equations 26, 27, 30 and 31.

The CPU 11 then uses the moment parameters Rp, ΔRp, γ and β to generate a Pearson distribution N(x) (S7). More specifically, the CPU 11 calculates coefficients b0, b1, b2 and A according to the Pearson IV function in Equation 2 to obtain a Pearson distribution data series (Xk, Np (Xk)) corresponding to the data series (Xk, Ck) of the SIMS distribution data. That is, the coefficients are determined and then Xk is substituted into Equation 2. Here, Np (x) is a distribution function of ion concentration according to Equation 2.

The CPU 11 then fine-adjusts L1, α1, L2 and α2 so that the Pearson distribution fits to the SIMS distribution (S8). This is done because there may be an error between the joined tail function and the Pearson distribution as illustrated in FIG. 10. The CPU 11 therefore may calculate the error ERp (k)=NP (Xk)−Ck and determine L1, α1, L2 and α2 that minimizes the sum of squares of the error Σ {ERp (k)}². The procedure of S8 is the same as S4. As a result of S8, the joined tail function itself includes some amount of error for the data series (Xk, Ck) of the SIMS distribution data. However, the Pearson distribution fits to the data series (Xk, Ck) of the SIMS distribution data as a result of S8. Then, the CPU 11 determines the moment parameters Rp, ΔRp, γ and β of the Pearson distribution that fits to data series (Xk, Ck) of the SIMS distribution data. The CPU 11 performs the operation at S8 as third adjusting means.

The CPU 11 then stores the determined moment parameters Rp, ΔRp, γ and β in the Pearson database 25 in association with the condition data such as the material of the substrate, ions species, and acceleration energy (S9). The moment parameters Rp, ΔRp, γ and β of the Pearson distribution represent the characteristic coefficients. The CPU 11 performs S9 as means for storing characteristic coefficients in a database.

In this way, the information processing apparatus 10 may obtain the moment parameters of the Pearson distribution that fits the SIMS distribution data through the use of the joined tail function while reducing arbitrariness.

Figure 19:
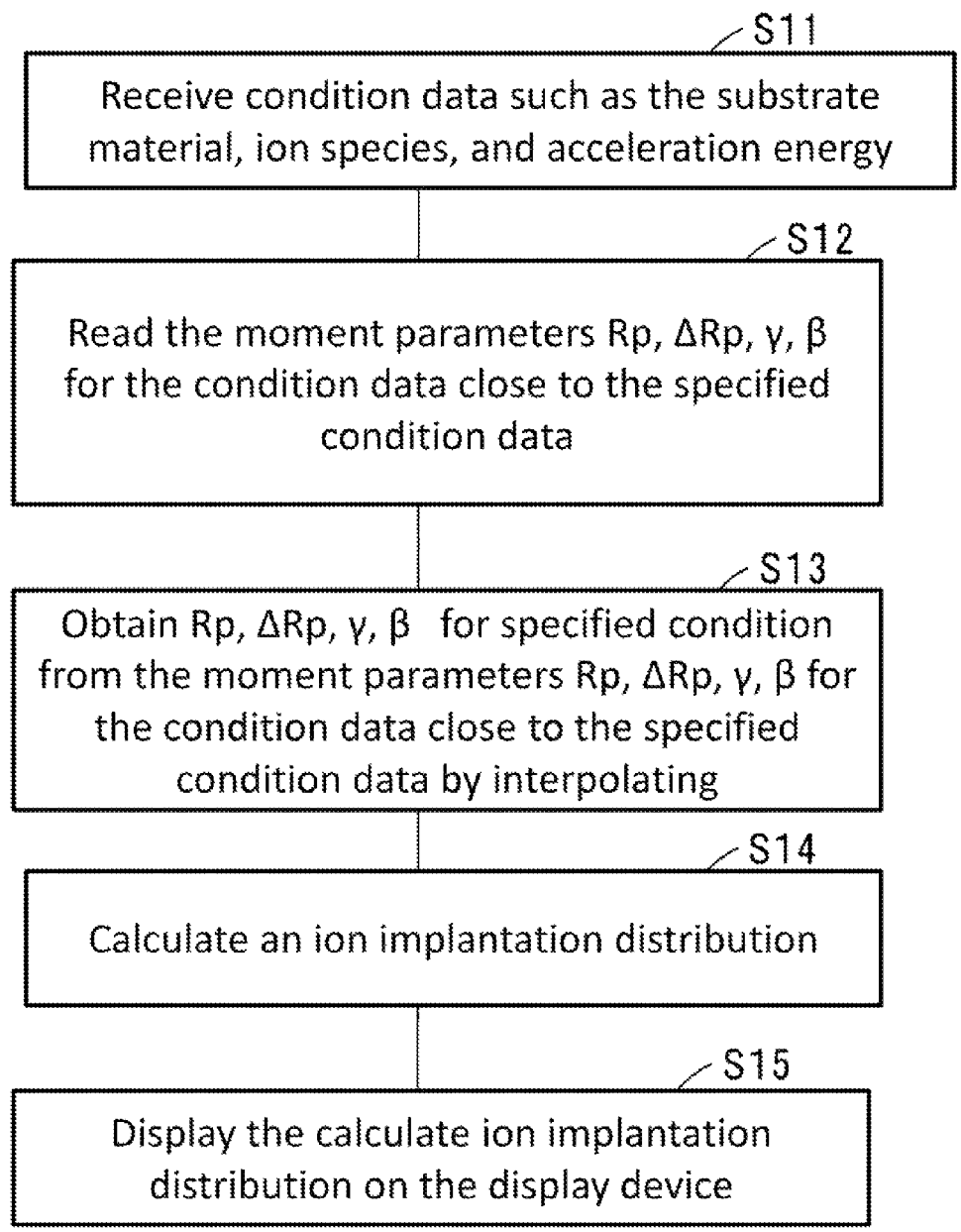
FIG. 19 is a flowchart illustrating a procedure for generating a concentration distribution of implanted ions by a Pearson distribution when user's desired conditions are specified.

FIG. 19 is a flowchart of a procedure for generating a concentration distribution of implanted ions by using a Pearson distribution under conditions desired and specified by the user. The CPU 11 performs the process from S11 through S15 according to a computer program loaded on the memory 12 in an executable manner. The information processing apparatus 10 may perform the process in FIG. 19 by itself to provide information on a concentration distribution of implanted ions to the user. Alternatively, the information processing apparatus 10 may perform the process in FIG. 19 in cooperation with a Computer Aided Design (CAD) system. For example, the information processing apparatus 10 may provide information on a concentration distribution of implanted ions to the CAD system through the communication section 16. A computer program that causes a computer to perform the process in FIG. 19 may be installed on the CAD system.

Alternatively, the information processing apparatus 10 may perform the process in FIG. 19 in corporation with a control computer of ion implantation equipment. For example, the information processing apparatus 10 may provide information on a predicted concentration distribution of implanted ions to the ion implantation equipment through the communication section 16. A computer program that causes a computer to execute the process in FIG. 19 may be installed on the control computer of the ion implantation equipment.

The CPU 11 first receives condition data such as the substrate material, ion species, and acceleration energy specified by the user through the user operation section 15 (S11). Alternatively, the CPU 11 may read the condition data from a command file on the external storage 13 in response to a command to execute the process in FIG. 19.

The CPU 11 then reads condition data close to the specified condition data from the database. The CPU 11 reads the moment parameters Rp, ΔRp, γ and β for the condition data close to the specified condition data (S12).

The CPU 11 then obtains Rp, ΔRp, γ and β for the specified condition from the moment parameters Rp, ΔRp, γ and β for the condition data close to the specified condition by interpolation (S13). The CPU 11 performs the operation at S13 as means for interpolating a characteristic coefficient corresponding to condition data of interest from characteristic coefficients stored in a database.

The CPU 11 then calculates an ion implantation distribution for the specified conditions from the moment parameters Rp, ΔRp, γ and β obtained by the interpolation (S14). The CPU 11 performs the operation at S14 as distribution data calculating means. The CPU 11 displays the calculated ion implantation distribution on the display device 14 (S15).

As has been described, the information processing apparatus 10 according to the first embodiment first fits a joined tail function to a data series (Xk, Ck) (k=1, ..., N where N is the number of pieces of data) of SIMS distribution data to determine parameters L1, α1, L2 and α2. The information processing apparatus 10 then calculates moment parameters Rp, ΔRp, γ, and β from the joined tail function to generate a Pearson distribution. The CPU 11 then changes the parameters L1, α1, L2 and α2 of the joined tail function as fine adjustments in order to fit the generated Pearson distribution to the data series (Xk, Ck). In this way, the information processing apparatus 10 uses the joined tail function as an intermediary function to generate the Pearson distribution. According to the procedure described above, the information processing apparatus 10 may reduce the arbitrariness of γ and β in a Pearson distribution as illustrated in FIGS. 2 through 5 and may generate the Pearson distribution with γ and β being associated by the ratio r as illustrated in Equations 30 and 31. Accordingly, when for example acceleration energy is determined, ΔRp1 and ΔR$_p$2 of the joined tail function are determined from the shape of the ion implantation distribution and therefore the r in Equation 5 is practically uniquely determined. Therefore, γ and β are practically uniquely determined by the ratio r as illustrated in Equations 30 and 31. That is, the relationship of the shape of the ion implantation distribution with γ and β is practically uniquely determined from condition data such as the material of the substrate, ion species, and acceleration energy. Therefore, the information processing apparatus 10 is capable of storing the condition data such as the material of the substrate, ion species, and acceleration energy in unique association with the shape of the ion implantation distribution in a database. The information processing apparatus 10 is also capable of generating an ion implantation distribution by interpolation of specified condition data according to the database in which the condition data such as the material of the substrate, ion species, and acceleration energy are uniquely associated with the shape of ion implantation distribution.

Second Embodiment

The information processing apparatus 10 in the first embodiment uses a joined trail function as an intermediary function to generate a Pearson distribution by a Pearson IV function. However, the joined tail function may be directly used instead of the Pearson IV function as the function for obtaining an interpolated ion implantation distribution for a data series (Xk, Ck) of SIMS distribution data.

Figure 20:
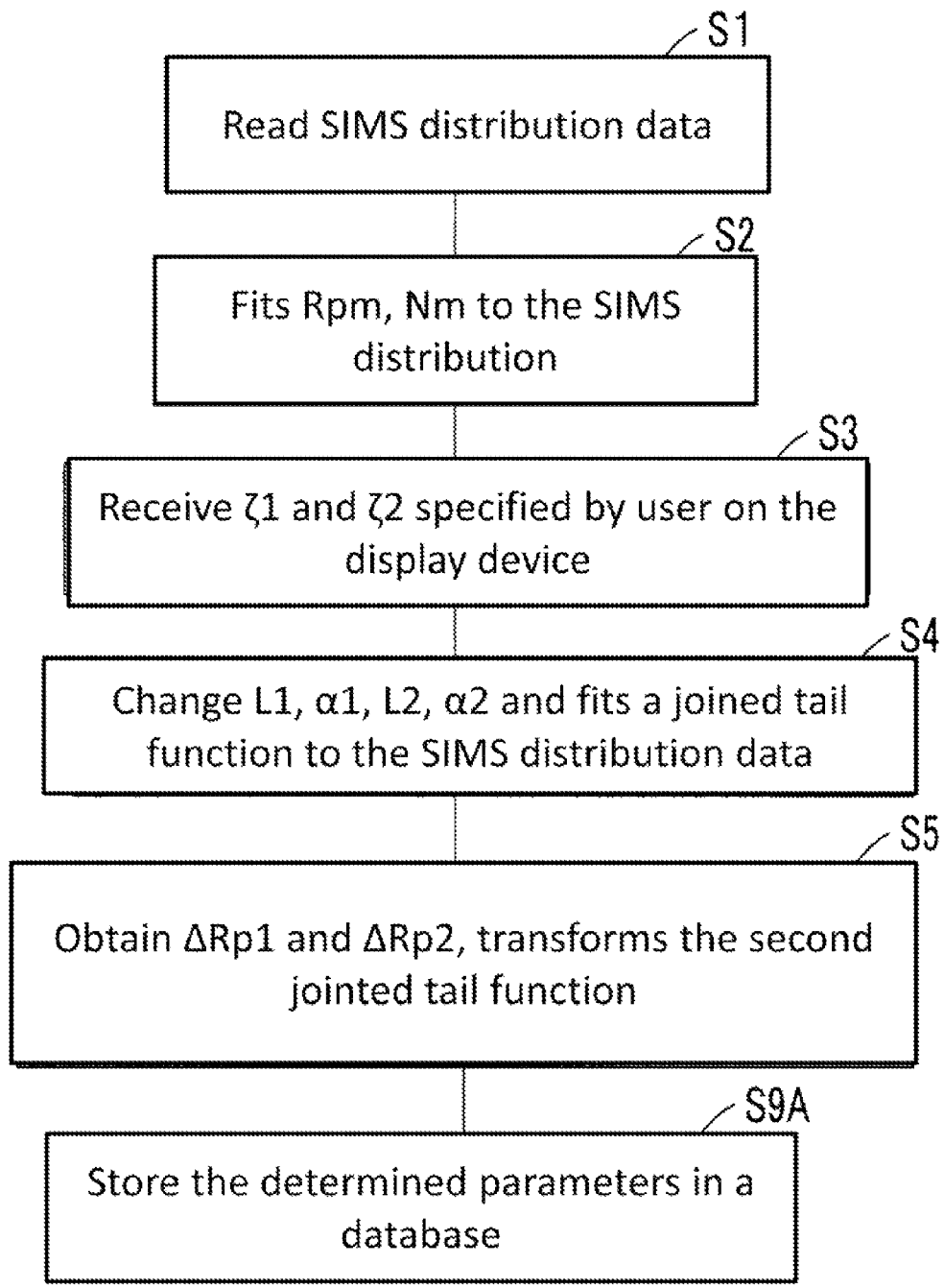
FIG. 20 is a flowchart of a process for obtaining parameters of a joined tail function from SIMS distribution data and storing the parameters in a database.

FIGS. 20 and 21 illustrate a procedure for using a joined tail function to obtain an ion implantation distribution. The CPU 11 performs the processes in FIGS. 20 and 21 according to a computer program loaded on the memory in an executable manner. The rest of the configuration and operations of the second embodiment are the same as those of the first embodiment and therefore the description of those configuration and operations will be omitted.

FIG. 20 is a flowchart of a process for obtaining parameters of a joined tail function from a data series (Xk, Ck) of SIMS distribution data and storing the parameters in a database. Step S1 through S5 of FIG. 20 are the same as those of FIG. 17 and therefore the description of S1 through S5 will be omitted. After determining $\Delta Rp1$ and $\Delta Rp2$ at S5, the CPU 11 associates and stores the determined parameters 1, $\alpha 1$, L2, $\alpha 2$, $\Delta Rp1$, $\Delta Rp2$ with condition data such as the material of the substrate, ion species and acceleration energy in a database (S9A). Parameters L1, $\alpha 1$, L2, $\alpha 2$, $\Delta Rp1$ and $\Delta Rp2$ represent function parameters. The CPU 11 performs the operation at S9A as means for storing function parameters for identifying first and second functions in a database in association with data on conditions under which the distribution data series was obtained.

FIG. 21 is a flowchart of a process for interpolating parameters of the joined tail function for specified condition data on the basis of the parameters of a joined tail function close to the specified condition data to obtain an ion concentration distribution for the specified condition data. Steps S11 and S15 of FIG. 21 are the same as those of FIG. 19 and therefore the description of S11 and S15 will be omitted. After receiving specified condition data in S1, the CPU 11 searches for L1, $\alpha 1$, L2, $\alpha 2$, $\Delta Rp1$ and $\Delta Rp2$ based on conditions close to the specified conditions and reads L1, $\alpha 1$, L2, $\alpha 2$, $\Delta Rp1$ and $\Delta Rp2$ for the conditions close to the specified conditions (S12A).

The CPU 11 then obtains L1, $\alpha 1$, L2, $\alpha 2$, $\Delta Rp1$ and $\Delta Rp2$ for the specified conditions from L1, $\alpha 1$, L2, $\alpha 2$, $\Delta Rp1$ and $\Delta Rp2$ for the condition data close to the specified conditions (S13A) by interpolation. The CPU 11 performs the operation at S13A as means for interpolating function parameters for condition data of interest from function parameters stored in the database.

The CPU 11 then calculates an ion implantation distribution for the specified conditions from L1, $\alpha 1$, L2, $\alpha 2$, $\Delta Rp1$ and $\Delta Rp2$ calculated by the interpolation (S14A). The CPU 11 performs the operation at S14A as means for calculating a distribution data series from a composite function of the first and second functions identified by the interpolated function parameters.

As has been described above, according to the first embodiment, the information processing apparatus 10 is capable of calculating an ion implantation distribution for specified conditions by using a joined tail function. The use of the joined tail function may reduce the arbitrariness of parameters of a distribution such as a Pearson distribution. Therefore, like the information processing apparatus 10 of the first embodiment, the information processing apparatus 10 of the second embodiment is capable of storing the condition data such as the material of the substrate, ion species, and acceleration energy in unique association with the shape of the ion implantation distribution in a database. The information processing apparatus 10 is also capable of generating an ion implantation distribution by interpolation of specified condition data according to the database in which the condition data such as the material of the substrate, ion species, and acceleration energy are uniquely associated with the shape of ion implantation distribution.

Third Embodiment

An exemplary process has been described in the first embodiment in which a Pearson distribution is generated through the use of a joined tail function. In the second embodiment, an example has been described in which an ion concentration distribution is generated through the use of a joined tail function, instead of a Pearson distribution. Both of the first and second embodiments use a single Pearson function or joined tail function to generate an ion implantation distribution. A single Pearson function or joined tail function is suitable for fitting to an ion concentration distribution equivalent to an ion implantation distribution of ions implanted in an amorphous semiconductor substrate, that is, a dose component in the amorphous part.

However, for an ion implantation distribution in a channeling part caused by ions passing through a substrate in which crystallinity is retained, that is, for an ion implantation distribution in which the tail notably appears, a dual Pearson distribution as illustrated in Equation 1 is often used. In a third embodiment, a process will be illustrated in which a tail function is used as the channeling part hc (x) of a dual Pearson distribution. Here, the tail function is one of the two functions included in a joined tail function. The third embodiment illustrates a process in which first the tail function for the channeling part is fit to the tail of an ion implantation distribution independently of the amorphous part and then a Pearson distribution for the amorphous part is combined with the result. The rest of the configuration and operations of the third embodiment are the same as those of the first and second embodiments. Therefore the same components of the third embodiment as those of the first or second embodiment are given the same reference symbols and the description of those symbols will be omitted.

<Tail Function and Pearson Tail Composite Function>

In the third embodiment, the function in Equation 35(1) is used as the distribution function representing an ion implantation distribution.

$N(x)=(\Phi-\Phi chan)*na(x)+\Phi chan*nc(x);$ [Expression 35(1)]

where, na (x) is a distribution function representing the ion concentration in an amorphous part and is specifically a Pearson distribution hma (x) in Equation 35(2):

$na(x)=hma(x);$ [Expression 35(2)]

In Equation 35(1), nc (x) is the ion concentration in a channeling part (tail) and is a composite function of the Pearson distribution hmc_nm (x) and the tail function htc_nm (x) as illustrated in Equation 35(3).

$$n_c(x) = \begin{cases} h_{mc\_n_m}(x) & \text{for } x \le x_T \\ \kappa[h_{mc\_n_m}(x) + h_{Tc\_n_m}(x)] & \text{for } x > x_T \end{cases} \quad \text{[Expression 35(3)]}$$

Here, $x_T$ is a coordinate at the boundary between the amorphous part and the tail and $x_T=Rp+\Delta Rp$. The Pearson distribution hmc_nm (x) represents a Pearson function that has the same moments as the Pearson distribution hmc_nm (x) of the amorphous part.

In Equation 35(3), κ is a coefficient that is determined from the continuity condition of the channeling part at the coordinate $x_T$. The tail function may be expressed by Equation 36. The tail function represents a third function and (nm0, xp, η, L, α) are third function parameter set.

$$h_{TC\_n_{m0}}(x) = n_{m0}\exp\left[-(\ln\eta)\left(\frac{x-x_p}{L}\right)^\alpha\right] \quad \text{[Expression 36]}$$

As has been described above, the Pearson distribution of the tail (Pearson distribution hmc_nm (x)) is a Pearson function that has the same moments as the Pearson distribution of the amorphous part (Pearson distribution hma (x)). The Pearson distribution of the amorphous part (Pearson distribution hma (x)) is generated by the fitting method using a joined tail function described with respect to FIG. 17 of the first embodiment.

On the other hand, for the channeling part, the information processing apparatus 10 extracts parameters by focusing on the tail as described below. First, attention is focused on the tail region ($x_T<x$) of the ion implantation distribution data (Xk, Ck) (k=1, . . . , N). Ion implantation distribution data (Xk, Ck) in the tail region ($x_T<x$) represents a second data series. The ion implantation distribution data (Xk, Ck) of the amorphous part represents a first data series.

The separate tail function in Equation 36 is used for fitting to the tail region. As a result, $n_{m0}$, L and α are determined. The separate tail function expressed by Equation 36 is not a distribution itself combined with the Pearson distribution. That is, the separate tail function matches the tail region ($x_T<x$) of the ion implantation distribution data (Xk, Ck) (k=1, . . . , N) but does not satisfy the continuity condition at $x=x_T$.

Therefore, a tail function to be combined is constructed as follows. Here, L and α of the tail function fitted in the tail region ($x_T<x$) are ultimate ones. In the tail function, κ is determined from the following continuity condition. First, a distribution function is provided in which the peak concentration in the Pearson distribution of the amorphous part is represented by $n_{m0}$. Here, $n_{m0}$ is the peak concentration of the tail function (Equation 36) obtained by fitting the tail function to the tail region of the ion implantation distribution. Then, κ may be obtained from the continuity condition at $x=x_T$ and Equation 35 as:

$$\kappa = \frac{h_{mc\_n_{m0}}(x_T)}{h_{mc\_n_{m0}}(x_T) + h_{Tc\_n_{m0}}(x_T)} \quad \text{[Expression 37]}$$

However, since κ in Equation 37 is determined from the continuity condition $a+x=x_T$, the peak concentration does not match the tail function fitted in the tail region ($x_T<x$) of the ion implantation distribution data (Xk, Ck) (k=1, . . . , N). That is, in the distribution function including the tail function of Equation 35(3), the Pearson distribution $h_{mc\_nm}$ (x) of the tail approaches 0 in the deep region in the substrate in which x in the region $x_T<x$ is sufficiently large. Therefore, in the deep region in the substrate, the tail function multiplied by the coefficient κ, $\kappa \times h_{tc\_nm}$ (x), is dominant. However, according to the procedure described above, the tail function without κ (Equation 36) has already been fitted in the deeper region in the substrate by the tail of the ion implantation distribution. Therefore, in order for the tail function multiplied by the coefficient κ, $\kappa \times h_{tc\_nm}$ (x), to match the distribution of the tail of the ion implantation distribution, the peak concentration of the tail function needs to be adjusted by the amount of κ. Specifically, using the condition that $\kappa \times h_{tc\_nm}$ (x) match the fitted function $h_{tc\_nm0}$ (x), $n_{nm}$ may be determined as:

$$n_{nm}=n_{nm0}/\kappa; \quad \text{[Expression 38]}$$

The peak concentration is also used in the Pearson distribution to be combined.

In this way, by adjusting the peak concentration in the tail function by the value of κ, the distribution function illustrated in Equation 35(3) well fits to the tail of the ion implantation distribution.

Thus, the function of the channeling part (tail) may be expressed by Equation 35(3).

By integrating the function of the channeling part (tail) expressed by Equation 35 (3), the dose for the channeling part (tail) $\phi_{chan}$ may be obtained as:

$$\phi chan=\int nc(x)dx \quad \text{[Expression 39]}$$

Figure 22:
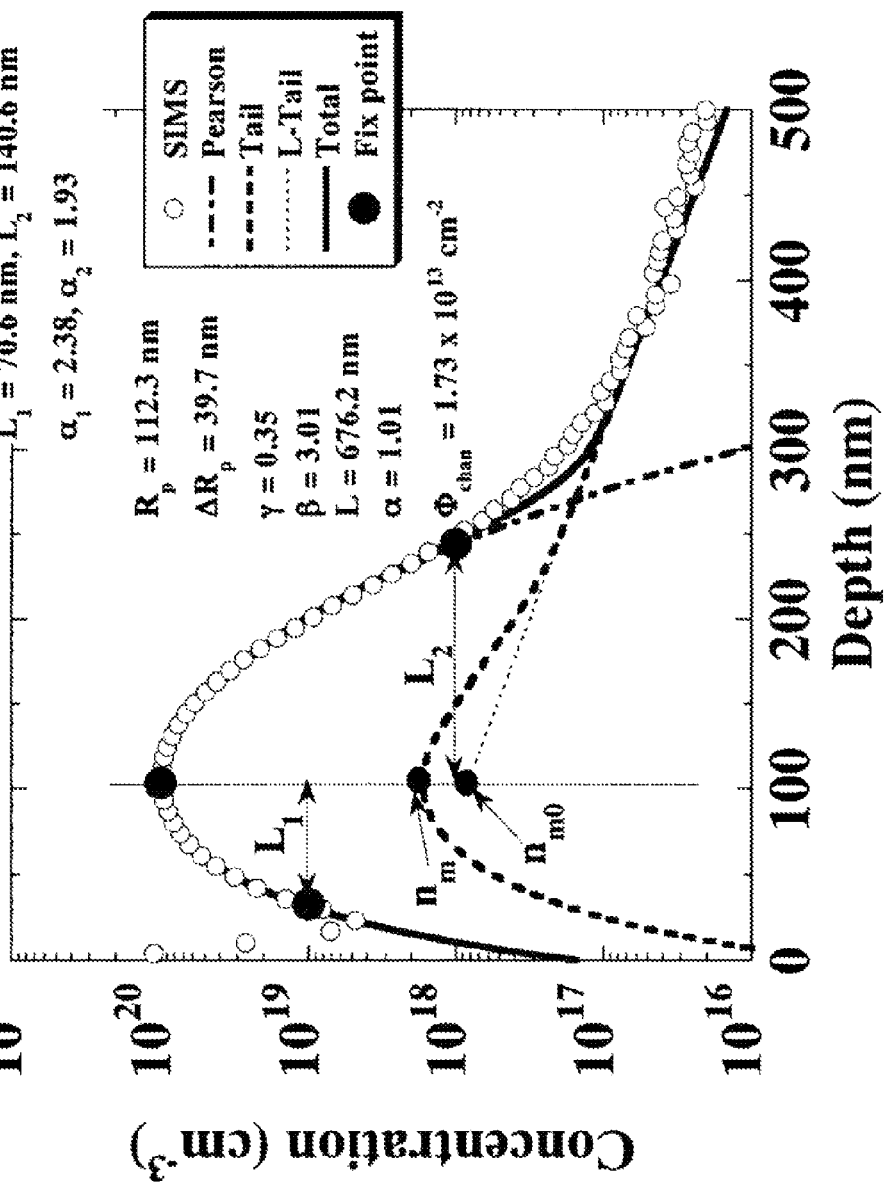
FIG. 22 is a diagram illustrating results of fitting of a composite function to a SIMS distribution of arsenic (AS) implanted at 160 keV.

FIG. 22 illustrates the result of the fitting of the composite function in Equation 35(3) to an SIMS distribution of arsenic (As) at 160 keV. In FIG. 22, $n_{nm0}$ is the peak concentration resulting from the fitting from the tail of the concentration distribution data obtained using SIMS and $n_{nm}$ is the peak concentration adjusted using Equation 38 to prevent the influence of multiplication by κ from appearing in the tail.

In the process of the fitting, the parameters are directly related to the shape of the distribution. Specifically, as in the first embodiment, the moment parameters (Rp, ΔRp, γ, β) of the Pearson distribution of the amorphous part may be determined while the arbitrariness is reduced. The tail function among the functions of the channeling part (tail) may be determined from the shape of the tail region ($x_T<x$) of the ion implantation distribution data (Xk, Ck) (k=1, . . . , N). Thus, according to the procedure of the third embodiment, the parameters may be uniquely and readily determined while reducing the arbitrariness.

<Example of Parameter Extraction>

In the example in FIG. 22, ζ1=10 because SIMS data is reliable to a depth where the concentration is an order of magnitude smaller than the peak concentration in the interval between the peak and the surface. Here, it is assumed that the distance between the peak to the position of that concentration has been identified as L1=70.6 nm. In order to fit the shape of the interval, the surface side of the joined tail function is determined with α1=2.38. Since the interval from the peak Rp to the Rp+L1 does not change during tuning of α1, α1 may be simply identified.

In the region deeper than the peak concentration position, that is, below the peak, the tail of the ion implantation distribution starts to appear around the position at which the concentration is two orders of magnitude smaller than the peak concentration. In order to focus attention on the concentration distribution that does not relate to the tail of the concentration distribution, $\zeta 2=20$ is assumed. The distance from the peak to the position of that concentration may be readily identified as $L2=140.6$ nm. In order to fit the shape of the interval from the peak Rp to the distance L2 on the deeper side of the peak Rp, the deeper side of the joined tail function is determined with $\alpha 2=1.93$. Since the interval from the peak Rp to the Rp+L2 does not change during tuning of $\alpha 2$, $\alpha 2$ may be readily identified. The moment parameters of the Pearson distribution are extracted from the distribution as illustrated in FIG. 22.

Then, L, $\alpha$ and $n_{m0}$ are fitted to the distribution deeper than 350 nm of the ion implantation distribution where the tail is dominant. A tail function to be combined with the Pearson distribution is generated from the resulting L, $\alpha$ and $n_{m0}$ as illustrated in Equations 36 to 38. Then, the dose of the distribution is estimated to obtain $\phi_{chan}$ according to Equation 39. In this way, extraction of the parameters may be accomplished.

<Process Flow>

Figure 23:
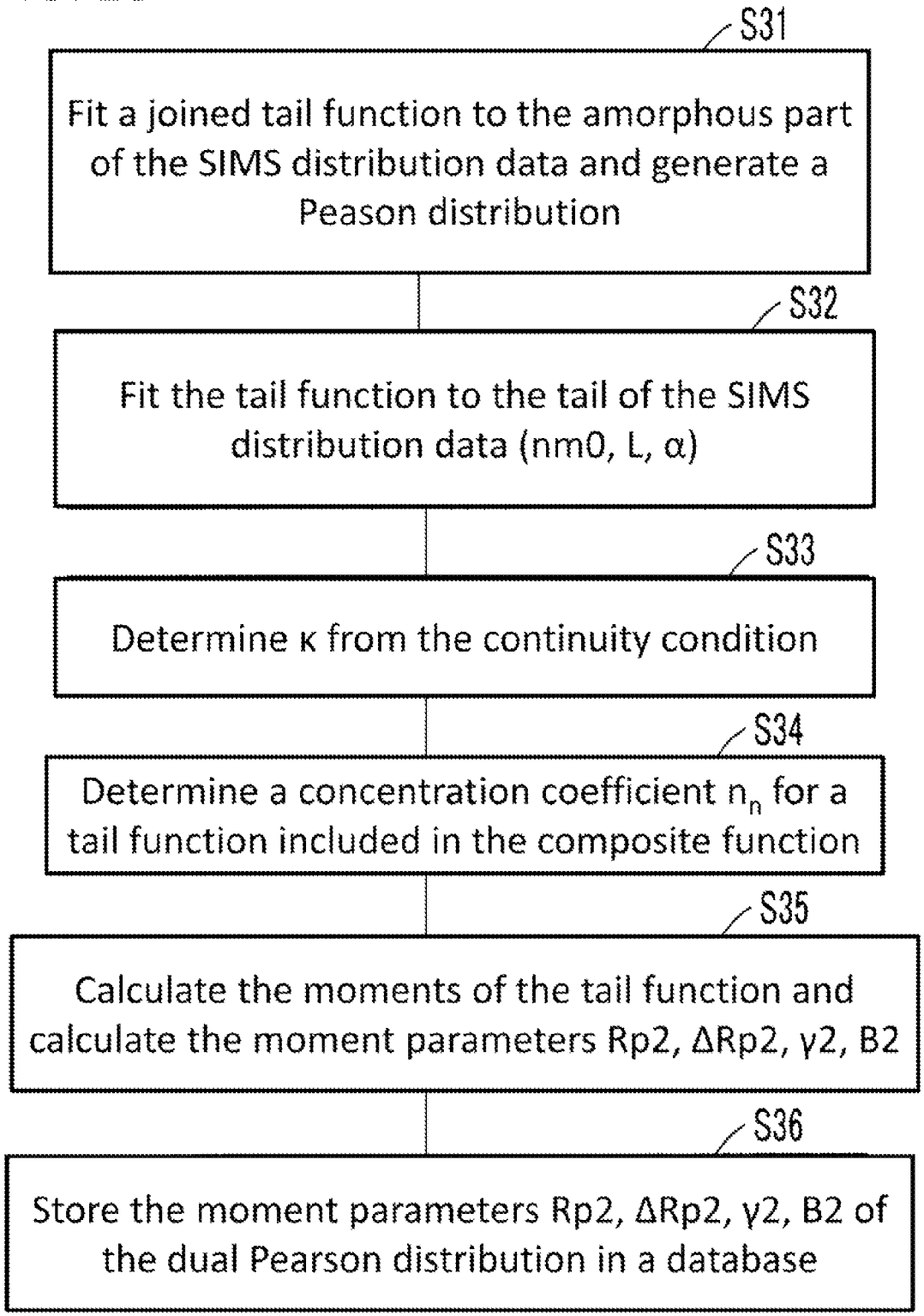
FIG. 23 is a flowchart of a process for fitting a composite function of a Pearson distribution and a tail function to an ion implantation distribution.

FIG. 23 is a flowchart of a process performed by the information processing apparatus 10 according to the third embodiment to fit a composite function of a Pearson distribution and a tail function to an ion implantation distribution. It is assumed here that SIMS distribution data (Xk, Ck) has been read. The CPU 11 first fits a joined tail function to the amorphous part of the SIMS distribution data to generate a Pearson distribution (S31). Details of the operation at S31 are the same as steps S2 through S8 in FIG. 17 described previously. As a result of S31, moment parameters Rp, $\Delta$Rp, $\gamma$ and $\beta$ are determined.

The CPU 11 then fits the tail function to the tail of the SIMS distribution data (S32). The CPU 11 performs the operation at S32 as fourth adjusting means. In the operation at S32, $\eta$ in Equation 36 may be fixed to an appropriate value, for example 1000, while $n_{m0}$, L and $\alpha$ are changed, and errors are estimated in a range where the tail is notable. The range where the tail is notable may be specified by the user.

Specifically, an error ER(k)=N(Xk)−Ck in the SIMS distribution data (Xk, Ck) (k=kt, . . . , N, where kt is the left-most point of the range where the tail is notable) may be calculated and $n_{m0}$, L and $\alpha$ may be determined such that the sum of squares of error $\Sigma$ {ER (k)}$^2$ is minimized. The procedure is as follows. For example, $n_{m0}$ is fixed and a distance L at which the value of the function will be $1/\eta$ is assumed. Then, $\alpha$ is changed in the direction in which the sum of squares of error $\Sigma$ {ER (k)}$^2$ decreases for $n_{m0}$ and L. Here, $\alpha$ may be determined by the bisection method, for example, in the range between predetermined minimum and maximum values. For example, the interval may be divided into two and the midpoint is extracted from each subinterval. The midpoint of the interval in which the error is smaller may be selected as the next value. Alternatively, $\alpha$ may be changed in the range between predetermined minimum and maximum values at predetermined pitches and an error may be estimated for $\alpha$ at every point.

The SIMS distribution data (Xk, Ck) (k=kt, . . . , N where kt is the left-most point of the range where the tail is notable) represents the second data series. The SIMS distribution data (Xk, Ck) (k=1, . . . , kt) represents the first data series.

Then, L is changed and the operation for changing $\alpha$ in the direction in which the sum of squares of error $\Sigma$ {ER (k)}$^2$ decreases is repeated for $n_{m0}$ and L. Here, L may be changed by the bisection method, for example, in the range between predetermined minimum and maximum values. For example, the interval may be divided into two and the midpoint is extracted from each subinterval. Then the midpoint of the subinterval in which the error is smaller may be selected as the next value. Alternatively, L may be changed in the range from predetermined minimum and maximum values at predetermined pitches and an error may be estimated for L at every point. Furthermore, $n_{m0}$ may be changed while changes in L and $\alpha$ and errors are repeatedly estimated.

The CPU 11 then determines K from the continuity condition (Equation 37) (S33). The CPU 11 performs the operation at S33 as means for setting a factor. The CPU 11 determines a concentration coefficient $n_n$ for a tail function included in the composite function from the condition that the tail function included in the composite function matches the function fitted in the tail (Equation 38) (S34). The information processing apparatus 10 performs the operation at S34 as means for adjusting the extreme value of the third function. By the operations at S33 and S34, the information processing apparatus 10 may adjust so that the concentration distribution of the tail function included in the composite function, that is, the tail function fitted at S32, fits the SIMS distribution data, with the tail function being multiplied by the factor $\kappa$ in Equation 35(3).

The CPU 11 then calculates the moments of the tail function and calculates the moment parameters Rp2, $\Delta$Rp2, $\gamma$2 and $\beta$2 of a dual Pearson distribution (S35). The CPU 11 stores the moment parameters Rp2, $\Delta$Rp2, $\gamma$2 and $\beta$2 of the dual Pearson distribution in a database in association with condition data such as the material of the substrate, ion species, and acceleration energy (S36). The set of the moment parameters Rp2, $\Delta$Rp2, $\gamma$2 and $\beta$2 of the dual Pearson distribution calculated from the moments of the tail function represents a second characteristic coefficient. The CPU 11 performs the operation at S35 as means for calculating the second characteristic coefficient. The CPU 11 performs the operation at S36 as means for storing the second characteristic coefficient in the database.

FIG. 24 is a flowchart of a process for obtaining a concentration distribution of an ion implantation distribution from the moment parameters Rp1, $\Delta$Rp1, $\gamma$1, $\beta$1, Rp2, $\Delta$Rp2, $\gamma$2 and $\beta$2 of the dual Pearson distribution by interpolation. Operations at S11, S14 and S15 of the process in FIG. 24 are the same as those of the process in FIG. 19 and therefore the description of the operations will be omitted.

The CPU 11 reads Rp1, $\Delta$Rp1, $\gamma$1, $\beta$1, Rp2, $\Delta$Rp2, $\gamma$2 and $\beta$2 for condition data close to condition data specified by the user (S12B).

The CPU 11 then obtains Rp1, $\Delta$Rp1, $\gamma$1, $\beta$1, Rp2, $\Delta$Rp2, $\gamma$2 and $\beta$2 for the specified conditions from Rp1, $\Delta$Rp1, $\gamma$1, $\beta$1, Rp2, $\Delta$Rp2, $\gamma$2 and $\beta$2 for condition data close to the specified condition data by interpolation (S13B). The CPU 11 then calculates the ion implantation distribution for the specified conditions from Rp1, $\Delta$Rp1, $\gamma$1, $\beta$1, Rp2, $\Delta$Rp2, $\gamma$2 and $\beta$2 obtained by the interpolation (S14B).

As has been described above, for the amorphous part of an ion implantation distribution, the information processing apparatus 10 of the third embodiment generates a Pearson distribution through the use of a joined tail function like the information processing apparatus 10 of the first embodiment. On the other hand, for the tail of the ion implantation distribution, the information processing apparatus 10 changes $n_{m0}$, L and $\alpha$ of the tail function and fits the shape of the tail function directly to the shape of the ion implantation distribution. The information processing apparatus 10 generates the channeling part of a dual Pearson distribution through the use of the tail function. Accordingly, in contrast to a case where the Pearson distribution is directly obtained, the arbitrariness of the parameters is reduced to increase the likelihood that the parameters of the dual Pearson distribution for the ion implantation distribution may be uniquely determined. If the parameters of the dual Pearson distribution for the ion implantation distribution may be uniquely determined, different databases obtained through different experiments, for example, may be readily combined together.

Fourth Embodiment

In the third embodiment, the Pearson distribution has been generated through the use of the joined tail function and the moment parameters of the Pearson distribution are stored in the database for the amorphous part of the ion implantation distribution as in the first embodiment. The tail function has been fitted to the tail of the ion implantation distribution and the Pearson distribution of the tail has been generated through the use of the obtained tail function and stored as the moment parameters of the dual Pearson distribution. Then the database has been searched based on the specified condition data and moment parameters for the specified condition data have been interpolated from condition data close to the specified condition data to generate a dual Pearson distribution. Instead of the process, the parameters of the joined tail function for the amorphous part of the ion implantation distribution may be stored in the database as in the second embodiment. For the tail, the parameters of the tail function may be stored. Then, condition data close to specified condition data may be retrieved from the database and parameters that interpolate the specified condition data may be obtained. That is, a composite function of joined tail function and a tail function may be used to generate ion concentration data. Furthermore, for the amorphous part of the ion implantation distribution, the tail of the Pearson distribution may be used and the tail function may be used for the tail to generate a composite function. That is, the joined tail function and the Pearson distribution generated through the use of the joined tail function may be provided to allow the user to select and use one of the joined tail function and the Pearson distribution. In addition, the tail function obtained for the tail of the ion implantation distribution and the Pearson distribution generated through the use of the tail function may be provided to allow the user to select and use one of the tail function and the Pearson distribution.

Figure 25:
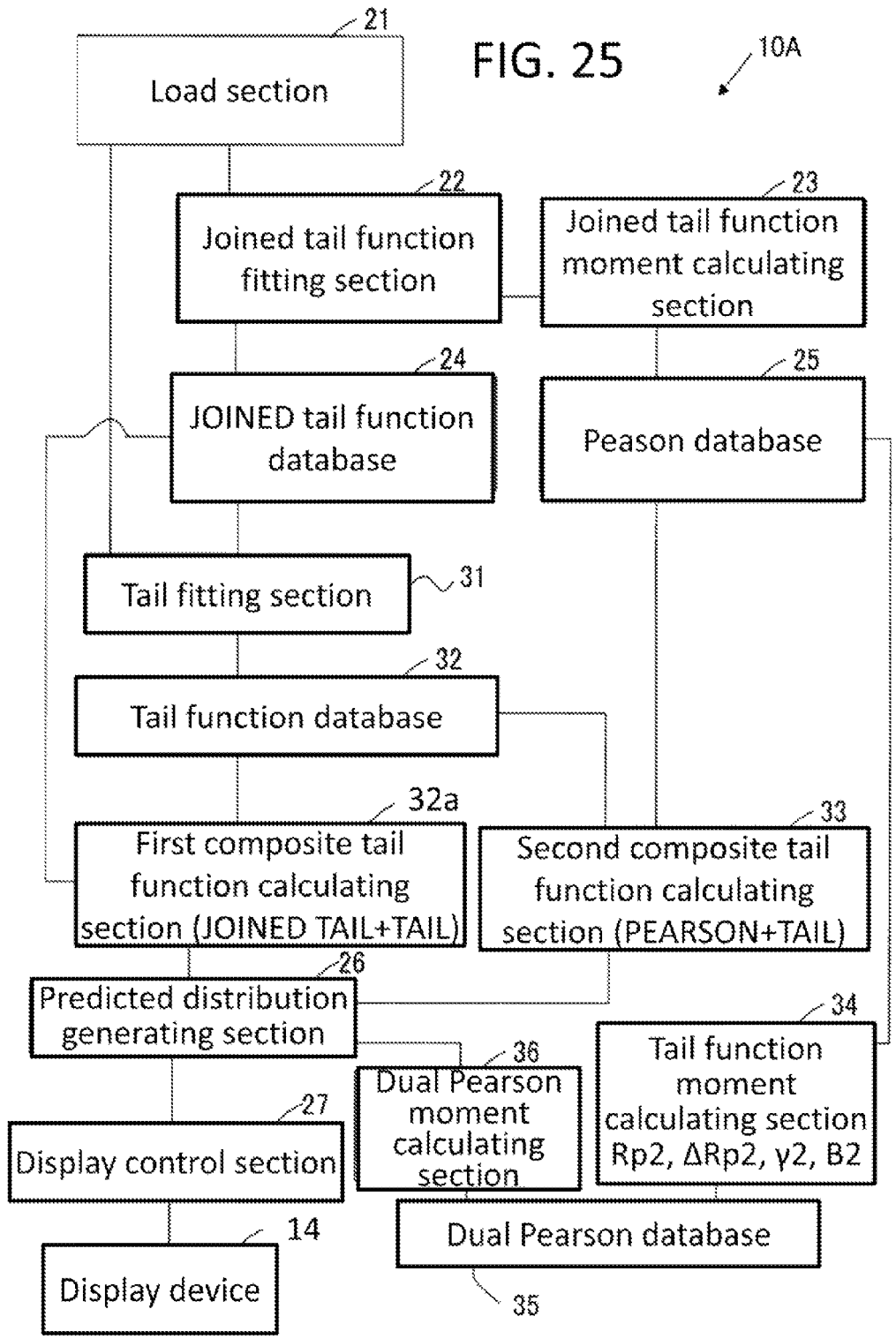
FIG. 25 is a diagram illustrating an exemplary system configuration of an information processing apparatus according to a fourth embodiment.

FIG. 25 illustrates an exemplary system configuration of an information processing apparatus 10A according to a fourth embodiment. The load section 21, the joined tail function fitting section 22, the joined tail function moment calculating section 23, the joined tail database 24, the Pearson database 25, the predicted distribution generating section 26, and the display control section 27 in FIG. 25 are the same in configuration as those in FIG. 15 and therefore the description of these components will be omitted.

A tail fitting section 31 fits the tail function in Equation 36 to the tail of an ion implantation distribution to determine parameters $n_{m0}$, L and $\alpha$. The tail fitting section 31 stores the determined parameters $n_{m0}$, L and $\alpha$ in a tail function database 32 in association with condition data such as the material of the substrate, ion species, and acceleration energy.

A first composite tail function calculating section 32a generates an ion implantation distribution from a composite function of a joined tail function and a tail function. For example, the first composite tail function calculating section 32a receives condition data such as the material of the substrate, ion species and acceleration energy specified by the user. The first composite tail function calculating section 32a then retrieves parameters Nm, Rpm, $\alpha 1$, $\Delta$Rp1, $\alpha 2$ and $\Delta$Rp2 of a joined tail function close to the specified condition data from the joined tail database 24. The first composite tail function calculating section 32a calculates the parameters Nm, Rpm, $\alpha 1$, $\Delta$Rp1, $\alpha 2$ and $\Delta$Rp2 for the specified condition data from the read parameters by interpolation.

The first composite tail function calculating section 32a reads parameters nm0, $\alpha$ and L of a tail function close to the specified condition data from the tail function database 32. The first composite tail function calculating section 32 calculates the parameters nm0, $\alpha$ and L for the specified condition data from the read parameters by interpolation. The first composite tail function calculating section 32a generates a composite function of the joined tail function and the tail function by using the interpolated parameters to calculate an ion implantation distribution.

Similarly, a second composite tail function calculating section 33 reads parameters of a Pearson distribution from the parameters of the Pearson database 25 and interpolates parameters for the specified condition data. The second composite tail function calculating section 33 reads parameters of the tail function from the parameters of the tail function database 32 and interpolates parameters for the specified condition data. The second composite tail function calculating section 33 generates a composite function of the Pearson distribution and the tail function. The second composite tail function calculating section 33 calculates an ion implantation distribution from the composite function of the Pearson distribution and the tail function.

A tail function moment calculating section 34 calculates the moments of a tail function and generates the parameters Rp2, $\Delta$Rp2, $\gamma 2$ and $\beta 2$ of a dual Pearson distribution. The tail function moment calculating section 34 stores the parameters Rp2, $\Delta$Rp2, $\gamma 2$ and $\beta 2$ of the dual Pearson distribution in a dual Pearson database 35 in association with the condition data such as the material of the substrate, ion species, and acceleration energy.

A dual Pearson calculating section 36 reads the parameters Rp2, $\Delta$Rp2, $\gamma 2$ and $\beta 2$ of the dual Pearson distribution from the dual Pearson database 35 and interpolates parameters for the specified condition data. The dual Pearson calculating section 36 also reads the parameters Rp1, $\Delta$Rp1, $\gamma 1$ and $\beta 1$ of the Pearson distribution from the Pearson database 25 and interpolates parameters for the specified condition data. The dual Pearson calculating section 36 then calculates a dual Pearson distribution. While the dual Pearson database 35 and the Pearson database 25 are depicted as separate databases in FIG. 25, the dual Pearson database 35 and the Pearson database 25 may be integrated into a single database. If such an integrated database is used, the dual Pearson calculating section 36 may read the parameters Rp1, $\Delta$Rp1, $\gamma 1$, $\beta 1$, Rp2, $\Delta$Rp2, $\gamma 2$ and $\beta 2$ at a time.

The predicted distribution generating section 26 provides the ion implantation distribution calculated through the first composite tail function calculating section 32, the second composite tail function calculating section 33 and the dual Pearson calculating section 36 to the display control section 26.

In this way, the information processing apparatus 10A of the fourth embodiment is capable of using any of a dual Pearson distribution, a composite function of a joined tail function and a tail function, and a composite function of a Pearson distribution and a tail function to generate predicted ion implantation distribution data for condition data specified by the user. The display control section 27 displays the predicted data on a display device 14.

Fifth Embodiment

Any of the information processing apparatuses 10 and 10A according to the first to fourth embodiments described above may cooperate with another apparatus such as a CAD system. For example, any of the information processing apparatuses 10 and 10A may generate parameters on the basis of ion implantation distribution data obtained by a Monte Carlo simulation performed on a CAD system and stores the parameters in a database. The information processing apparatus 10 or 10A may then provide the predicted data it generated to the CAD system. The CAD system may use the predicted data provided from the information processing apparatus 10 or 10A as input data for the next Monte Carlo simulation. The CAD system may calculate device characteristics on the basis of the predicted data provided from the information processing apparatus 10 or 10A for assisting the user in designing devices.

Furthermore, any of the information processing apparatuses 10 and 10A according to the first to fourth embodiment described above may cooperate with an apparatus such as an ion implantation system. For example, any of the information processing apparatuses 10a and 10A may provide predicted data it generated to the ion implantation system. A control computer of the ion implantation system may tune ion implantation conditions on the basis of the predicted data provided from the information processing apparatus 10 or 10A. For example, the control computer of the ion implantation system may obtain ion implantation distributions for the material of a substrate in which ions are to be implanted and the ion species to be implanted at varying acceleration energies. The control computer of the ion implantation system may assist the user in setting optimum acceleration energy on the basis of ion implantation depth data. The control computer of the ion implantation system may also assist the user in setting ion implantation conditions on the basis of predicted data provided from the information processing apparatus 10 or 10A.

FIG. 26 illustrates an exemplary system configuration including the information processing apparatus 10A and a cooperating apparatus 37 that cooperates with the information processing apparatus 10A. The information processing apparatus 10A may be contained in the cooperating apparatus 37. Alternatively, the information processing apparatus 10A may communicate with the cooperating apparatus 37 through the communication section 16. Here, the cooperating apparatus 37 may be an apparatus such as a CAD system or an ion implantation system.

Sixth Embodiment

Since a Pearson distribution includes an exponential term, the value of a parameter may diverge during calculation and causes an overflow. In a sixth embodiment, an information processing apparatus that avoids an overflow of a value during calculation of a Pearson distribution will be described.

To avoid the problem of divergence, the following calculation procedure is performed. A Pearson distribution is one of a function family derived from the differential equation in Equation 40.

$$\frac{dh}{ds} = \frac{(s-a)h}{b_0 + b_1 s + b_2 s^2} \qquad \text{[Expression 40]}$$

When Nm, Rp, ΔRp, γ and β are given, coefficients for a Pearson IV distribution are given by Equations 41 to 45.

$$b_0 = -\frac{4\beta - 3\gamma^2}{A}\Delta R_p^2 \qquad \text{[Expression 41]}$$

$$b_1 = -\frac{\beta + 3}{A}\gamma \Delta R_p \qquad \text{[Expression 42]}$$

$$b_2 = -\frac{2\beta - 3\gamma^2 - 6}{A} \qquad \text{[Expression 43]}$$

$$a = b_1; \qquad \text{[Expression 44]}$$

$$A = 10\beta - 12\gamma^2 - 18; \qquad \text{[Expression 45]}$$

When these coefficients are estimated, 1 may be assigned to coefficient K in Equation 46 to calculate Equation 46 and then the value of K may be set such that the peak concentration of Nm is yielded.

[Expression 46]

$$h_0 = K|b_0 + b_1 s + b_2 s^2|^{\frac{1}{2b_2}} \exp\left[-\left(\frac{b_1}{2b_2} + a\right)\frac{2}{\sqrt{4b_2 b_0 - b_1^2}}\tan^{-1}\left(\frac{2b_2 s + b_1}{\sqrt{4b_2 b_0 - b_1^2}}\right)\right]$$

However, if the Pearson distribution is simply calculated, the term exp may diverge (or overflow) in the calculation. Therefore, the information processing apparatus of the sixth embodiment treats values in the form of ln[h] and calculates an actual distribution. Here, ln is a natural logarithm.

Since K in Equation 46 is merely a correction parameter, it is assumed here that K is equal to 1. Then, Equation 46 may be rewritten as:

[Expression 47]

$$\ln h_0 = \frac{1}{2b_2}\ln|b_0 + b_1 s + b_2 s^2| - \left(\frac{b_1}{2b_2} + a\right)\frac{2}{\sqrt{4b_2 b_0 - b_1^2}}\tan^{-1}\left(\frac{2b_2 s + b_1}{\sqrt{4b_2 b_0 - b_1^2}}\right)$$

Since the left-hand side of Equation 40 represents the rate of change of the function, ln[h0] in Equation 47 takes the maximum value ln[hmax] when s=a. Therefore, ln[hmax] is calculated according to Equation 48.

[Expression 48]

$$\ln h_{max} = \frac{1}{2b_2}\ln|b_0 + b_1 a + b_2 a^2| - \left(\frac{b_1}{2b_2} + a\right)\frac{2}{\sqrt{4b_2 b_0 - b_1^2}}\tan^{-1}\left(\frac{2b_2 a + b_1}{\sqrt{4b_2 b_0 - b_1^2}}\right)$$

First, ln[h1]=ln[h0]−ln[hmax]=ln[h0/hmax] is estimated. The maximum value of ln[h1] is 0. The concentration distribution for ln[h1] is given by:

$$N_1 = \exp\left[\ln\left(\frac{h_0}{h_{max}}\right)\right] = \frac{h_0}{h_{max}} \qquad \text{[Expression 49]}$$

Equation 49 is the distribution function for the maximum value of 1 and therefore divergence, or an overflow, may be suppressed. Therefore, the dose (the amount of ions implanted in a unit area viewed from the surface of the substrate) given by Equation 49 may be estimated by Equation 50:

$$d\text{Sum} = \int_{-\infty}^{\infty} N(x) dx \quad \text{[Expression 50]}$$

Then the calculated dose for the ion concentration distribution is converted by Equation 51 so as to match the dose $\Phi$ that is an experimental condition.

$$N\text{final} = (\Phi/d\text{Sum})N1 \quad \text{[Expression 51]}$$

In this way, the distribution function may be calculated while divergence of a value is suppressed. The procedure of the calculations by Equations 47 to 51 may be applied to other distributions as well as Pearson IV distributions.

<Process Flow>

FIG. 27 is a flowchart of a process performed by the information processing apparatus 10 according to the sixth embodiment. The process reduces divergence of values in calculation of a Pearson function. The CPU 11 of the information processing apparatus 10 may perform the process in FIG. 27 when the CPU 11 calculates a Pearson function in operations such as S7 of FIG. 17 and S14 of FIG. 19.

In the process in FIG. 27, the CPU 11 first calculates the maximum value In[hmax (s=a)] of the Pearson function in the logarithm domain (S41). The CPU 11 performs the operation at S41 as means for calculating the maximum value of distribution data on a logarithmic axis.

The CPU 11 then calculates the Pearson function In[h0 s=xk)] in the logarithm domain at a depth xk in a substrate on which calculation is to be performed (k=1, ..., N, where N is the number of coordinate points on which calculation is to be performed) (S42). The CPU 11 performs the operation at S42 as means for calculating distribution data on a logarithmic axis.

The CPU 11 then calculates In[h1(xk)]=In[h0(s=xk)]−In[hmax(s=a)] (S43). The CPU 11 performs the operation at S43 as means for subtracting the maximum value of distribution data on a logarithmic axis from the distribution data on the logarithmic axis.

The CPU 11 then converts In[h1] from the logarithmic axis back to the linear coordinate axis (S44). That is, the CPU 11 calculates Equation 49. The CPU 11 performs the operation at S44 as means for converting distribution data on a logarithmic axis from which the maximum value has been subtracted to distribution data on a linear axis.

The CPU 11 then obtains h1(xk) for N points x k (k= 1, ..., N) on which calculation is to be performed (S45). The CPU 11 calculates the implantation area by using h1(xk) (k=1, ..., N) to adjust the result to the dose in the experimental data (SIMS)(S46).

According to the process described above, the information processing apparatus 10 calculates the Pearson distribution in a logarithm domain as illustrated in S41 through 43 of FIG. 27. Before converting In[h1] from the logarithmic axis back to the linear coordinate axis, the information processing apparatus 10 performs the operation at S43 to subtract the maximum value of the function in the logarithm domain from the function in the logarithm domain, thereby reducing the calculated value up to 0. That is, the information processing apparatus 10 is capable of suppressing divergence, or an overflow, of a value in each calculation process by the calculation in the logarithm domain and reduction of the maximum value in the conversion from the logarithm domain to the linear domain.

The sixth embodiment applied to the information processing apparatus 10 according to any of the first to third embodiments has been described. However, the process of the sixth embodiment may be applied to the information processing apparatus 10A of any of the fourth and fifth embodiments as well. Furthermore, while the sixth embodiment has been described with respect to calculation of a Pearson function by way of example, the sixth embodiment may be applied to calculation of values of other functions as well.

<Other Variations>

In the embodiments described above, a Pearson distribution for ion implantation distribution data obtained using SIMS is generated through the use of a joined tail function. Also, a tail function was fitted to the tail of the ion implantation distribution. However, the processes of the embodiments described above are not limited to application to ion implantation distribution data obtained using SIMS. The processes are applicable to various ion implantation distribution data as well. The processes of the embodiments described above are not limited to measured ion implantation distribution data. For example, the processes are also applicable to ion implantation distribution data obtained by a Monte Carlo simulation. The processes of the embodiments described above are not limited to ion implantation distribution data. The processes are also applicable to various types of distribution data, for example physical quantities that vary around a mean value, such as concentration, temperature, accuracy, line width, film thickness, resistance, voltage, gain, and delay time. The processes of the embodiments described above are not limited to physical phenomena. The processes are also applicable to economic and social phenomena and various kinds of distribution data having a tail that vary around the center value, such as predicted stock prices, predicted fluctuations in exchange, predicted precipitation, and predicted production volumes.

The processes of the embodiments described above may also be applied to distribution data that is convex downward, for example, by converting the sign of values.

<Computer-Readable Recording Medium>

A program that causes a computer or other machine or device (hereinafter referred to as a computer or the like) to perform any of the functions described above may be recorded on a recording medium readable by the computer or the like. By causing the computer or the like to read and execute the program on the recording medium, the computer or the like may be caused to provide the functions.

Here, the recording medium readable by a computer or the like is a recording medium on which information such as data and programs may be stored electrically, magnetically, optically, mechanically or chemically and from which a computer or the like may read the data and programs. Examples of such recording media that are removable from a computer or the like include a flexible disk, magneto-optical disk, CD-ROM, CD-R/W, DVD, Blu-ray disc, DAT, 8-mm tape, and a memory card such as a flash memory card. Examples of recording media fixed in a computer or the like include a hard disk and read-only memory (ROM).

<Others>

The embodiments further include the embodiments defined in the claims. The component or components in each claim may be combined with any of the components of the other claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a receiving device for receiving a distribution data series including an extreme value of a value corresponding to a position on a coordinate axis and data describing a condition under which the distribution data series has been obtained;
    a first adjusting device for adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;
    a second adjusting device for adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;
    a calculator for calculating a characteristic coefficient identifying a Pearson function from a moment of a function including the first and second functions joined at the position of the extreme value;
    a storage device for storing the characteristic coefficient in a database in association with the data describing the condition under which the distribution data series has been obtained;
    an interpolator for interpolating a characteristic coefficient for condition data of interest from the characteristic coefficient stored in the database; and
    a distribution data calculator for calculating distribution data by a Pearson function identified by the interpolated characteristic coefficient.

2. The information processing apparatus according to claim 1, wherein the distribution data calculator comprises:
    a first logarithmic distribution data calculator for calculating distribution data on a logarithmic axis;
    a second logarithmic distribution data calculator for calculating a maximum value of the distribution data on the logarithmic axis;
    a third logarithmic distribution data calculator for subtracting the maximum value of the distribution data on the logarithmic axis from the distribution data on the logarithmic axis; and
    a third linear distribution data calculator for converting the distribution data on the logarithmic axis from which the maximum value has been subtracted to distribution data on a linear axis.

3. An information processing apparatus comprising:
    a receiving device for receiving a distribution data series including an extreme value of a value corresponding to a position on a coordinate axis and data describing a condition under which the distribution data series has been obtained;
    a first adjusting device for adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;
    a second adjusting device for adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;
    a storage device for storing a function parameter set for identifying the first and second functions in a database in association with the data describing the condition under which the distribution data series has been obtained, the function parameter set including at least one of the first function parameter set, the second function parameter set, a parameter set converted from the first function parameter set, and a parameter set converted from the second function parameter set;
    an interpolator for interpolating a function parameter for condition data of interest from the function parameter set stored in the database; and
    a calculator for calculating a distribution data series by a composite function of the first and second functions identified by the interpolated function parameter set.

4. The information processing apparatus according to claim 3, wherein the distribution data series includes a first data series in which data appear in a convex or concave curve with the extreme value at a peak or valley and a second data series having a smaller value-change rate than the first data series, the information processing apparatus further comprising:
    a third adjusting device for adjusting at least one function parameter in a third function parameter set to reduce an error between distribution data generated by a third function and the second distribution data series, the third function including the third function parameter set, the third function parameter set specifying the extreme value, the position of the extreme value, and the ratio of a value at a third distance from the position of the extreme value in the direction of the second data series to the extreme value, and an order of an expression of an exponent part of a function curve including an exponential form in the interval from the position of the extreme value to the third distance in the direction of the second data series.

5. An information processing method performed by a computer, comprising:

inputting a distribution data series including an extreme value of a value corresponding to a position on a coordinate axis and data describing a condition under which the distribution data series has been obtained;

adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;

adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;

calculating a characteristic coefficient identifying a Pearson function from a moment of a function including the first and second functions joined at the position of the extreme value;

storing the characteristic coefficient in a database in association with the data describing the condition under which the distribution data series has been obtained;

interpolating a characteristic coefficient for condition data of interest from the characteristic coefficient stored in the database; and calculating distribution data by a Pearson function identified by the interpolated characteristic coefficient.

6. The information processing method according to claim 5, further comprising:

adjusting the first and second function parameter sets to reduce an error between data generated by the Pearson function identified by the characteristic coefficient calculated from the moment and the input distribution data series.

7. The information processing method according to claim 5, wherein the distribution data series includes a first data series in which data appear in a convex or concave curve with the extreme value at a peak or valley and a second data series having a smaller value-change rate than the first data series, the information processing method further comprises:

adjusting at least one function parameter in a third function parameter set to reduce an error between data generated by a third function and the second data series, the third function including the third function parameter set, the third function parameter set specifying the extreme value, the position of the extreme value, and the ratio of a value at a third distance from the position of the extreme value in the direction of the second data series to the extreme value, and an order of an expression of an exponent part of a function curve including an exponential form in the interval from the position of the extreme value to the third distance in the direction of the second data series.

8. The information processing method according to claim 7, further comprising:

setting a factor for the Pearson function, the factor being determined from a condition that functions resulting from multiplication of the sum of the Pearson function and the third function by the factor are continuous; and adjusting an extreme value of the third function so that the third function multiplied by the factor matches the second data series.

9. An information processing method performed by a computer, comprising:

inputting a distribution data series including an extreme value of a value corresponding to a position on a coordinate axis and data describing a condition under which the distribution data series has been obtained;

adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;

adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;

storing a function parameter set for identifying the first and second functions in a database in association with the data describing the condition under which the distribution data series has been obtained, the function parameter set including at least one of the first function parameter set, the second function parameter set, a parameter set converted from the first function parameter set, and a parameter set converted from the second function parameter set;

interpolating a function parameter for condition data of interest from the function parameter set stored in the database; and calculating a distribution data series by a composite function of the first and second functions identified by the interpolated function parameter set.

10. The information processing method according to claim 9, wherein the distribution data series includes a first data series in which data appear in a convex or concave curve with the extreme value at a peak or valley and a second data series having a smaller value-change rate than the first data series, the information processing method further comprises:

adjusting at least one function parameter in a third function parameter set to reduce an error between distribution data generated by a third function and the second data series, the third function including the third function parameter set, the third function parameter set specifying the extreme value, the position of the extreme value, and the ratio of a value at a third distance from the position of the extreme value in the direction of the second data series to the extreme value, and an order of an expression of an exponent part of a function curve including an exponential form in the interval from the position of the extreme value to the third distance in the direction of the second data series.

11. The information processing method according to claim 10, further comprising:

calculating a second characteristic coefficient identifying a Pearson function from the third function parameter set; and storing the second characteristic coefficient in a database in association with the data describing the condition under which the distribution data series has been obtained.

12. The information processing method according to claim 11, wherein the calculating a distribution data series by a composite function of the first and second functions identified by the interpolated function parameter set further comprises:

calculating distribution data on a logarithmic axis;

calculating a maximum value of the distribution data on the logarithmic axis;

subtracting the maximum value of the distribution data on the logarithmic axis from the distribution data on the logarithmic axis; and converting the distribution data on the logarithmic axis from which the maximum value has been subtracted to distribution data on a linear axis.

13. A computer readable medium includes a program causing a computer to perform an information processing method, the information processing method comprising:

inputting a distribution data series including an extreme value of a value corresponding to a position on a coordinate axis and data describing a condition under which the distribution data series has been obtained;

adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;

adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;

calculating a characteristic coefficient identifying a Pearson function from a moment of a function including the first and second functions joined at the position of the extreme value;

storing the characteristic coefficient in a database in association with the data describing the condition under which the distribution data series has been obtained;

interpolating a characteristic coefficient for condition data of interest from the characteristic coefficient stored in the database; and calculating distribution data by a Pearson function identified by the interpolated characteristic coefficient.

14. The computer readable medium according to claim 13, the information processing method further comprising:

adjusting the first and second function parameter sets to reduce an error between data generated by the Pearson function identified by the characteristic coefficient calculated from the moment and the input distribution data series.

15. The computer readable medium according to claim 13, wherein the distribution data series includes a first data series in which data appear in a convex or concave curve with the extreme value at a peak or valley and a second data series having a smaller value-change rate than the first data series, the information processing method further comprising:

adjusting at least one function parameter in a third function parameter set to reduce an error between data generated by a third function and the second data series, the third function including the third function parameter set, the third function parameter set specifying the extreme value, the position of the extreme value, and the ratio of a value at a third distance from the position of the extreme value in the direction of the second data series to the extreme value, and an order of an expression of an exponent part of a function curve including an exponential form in the interval from the position of the extreme value to the third distance in the direction of the second data series.

16. The computer readable medium according to claim 15, the information processing method further comprising:

setting a factor for the Pearson function, the factor being determined from a condition that functions resulting from multiplication of the sum of the Pearson function and the third function by the factor are continuous; and adjusting an extreme value of the third function so that the third function multiplied by the factor matches the second data series.

17. A computer readable medium includes a program causing a computer to perform an information processing method, the information processing method comprising:

inputting a distribution data series including an extreme value of a value corresponding to a position on a coordinate axis and data describing a condition under which the distribution data series has been obtained;

adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;

adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;

storing a function parameter set for identifying the first and second functions in a database in association with the data describing the condition under which the distribution data series has been obtained, the function parameter set including at least one of the first function parameter set, the second function parameter set, a parameter set converted from the first function parameter set, and a parameter set converted from the second function parameter set;

interpolating a function parameter for condition data of interest from the function parameter set stored in the database; and calculating a distribution data series by a composite function of the first and second functions identified by the interpolated function parameter set.

18. The computer readable medium according to claim 17, wherein the distribution data series includes a first data series in which data appear in a convex or concave curve with the extreme value at a peak or valley and a second data series having a smaller value-change rate than the first data series, the information processing method further comprising:

adjusting at least one function parameter in a third function parameter set to reduce an error between distribution data generated by a third function and the second distribution data series, the third function including the third function parameter set, the third function parameter set specifying the extreme value, the position of the extreme value, and the ratio of a value at a third distance from the position of the extreme value in the direction of the second data series to the extreme value, and an order of an expression of an exponent part of a function curve including an exponential form in the interval from the position of the extreme value to the third distance in the direction of the second data series.

19. The computer readable medium according to claim 17, wherein the calculating a distribution data series by a composite function of the first and second functions identified by the interpolated function parameter set further comprises:

calculating distribution data on a logarithmic axis; calculating a maximum value of the distribution data on the logarithmic axis;

subtracting the maximum value of the distribution data on the logarithmic axis from the distribution data on the logarithmic axis; and converting the distribution data on the logarithmic axis from which the maximum value has been subtracted to distribution data on a linear axis.

20. A system comprising:

a receiving device for inputting a distribution data series including an extreme value of a value corresponding to a position on a coordinate axis and data describing a condition under which the distribution data series has been obtained;

a first adjusting device for adjusting a first function parameter set to reduce an error between data generated by a first function and the distribution data series, the first function including the first function parameter set, the first function parameter set specifying the position of the extreme value, the ratio of a value at a first distance on the coordinate axis from the position of the extreme value in a first direction to the extreme value, and an order of expression of an exponent part of a function curve including an exponential form in the interval from the position of the extreme value to the first distance in the first direction;

a second adjusting device for adjusting a second function parameter set to reduce an error between data generated by a second function and the distribution data series, the second function including the second function parameter set, the second function parameter set specifying the position of the extreme value, the ratio of a value at a second distance on the coordinate axis from the position of the extreme value in a second direction to the extreme value, and an order of expression of an exponent part of a function curve including an exponential form in the interval from the position of the extreme value to the second distance in the second direction;

a calculator for calculating a characteristic coefficient identifying a Pearson function from a moment of a function including the first and second functions joined at the position of the extreme value;

a storage device for storing the characteristic coefficient in a database in association with the data describing the condition under which the distribution data series has been obtained;

an interpolator for interpolating a characteristic coefficient for condition data of interest from the characteristic coefficient stored in the database;

a distribution data calculator for calculating distribution data by a Pearson function identified by the interpolated characteristic coefficient; and an ion implantation apparatus.

* * * * *